US008942096B2

(12) United States Patent
Arvidsson et al.

(10) Patent No.: US 8,942,096 B2
(45) Date of Patent: Jan. 27, 2015

(54) CONGESTION-BASED TRAFFIC METERING

(75) Inventors: Ake Arvidsson, Solna (SE); Tord Westholm, Vendelso (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 257 days.

(21) Appl. No.: 13/375,625

(22) PCT Filed: Jun. 3, 2009

(86) PCT No.: PCT/IB2009/005837
§ 371 (c)(1),
(2), (4) Date: Dec. 1, 2011

(87) PCT Pub. No.: WO2010/140015
PCT Pub. Date: Dec. 9, 2010

(65) Prior Publication Data
US 2012/0092995 A1 Apr. 19, 2012

(51) Int. Cl.
*H04L 1/00* (2006.01)
*H04L 12/801* (2013.01)
*H04L 12/813* (2013.01)
*H04L 12/825* (2013.01)

(52) U.S. Cl.
CPC ............... *H04L 47/10* (2013.01); *H04L 47/11* (2013.01); *H04L 47/14* (2013.01); *H04L 47/20* (2013.01); *H04L 47/26* (2013.01); *H04L 47/33* (2013.01); *H04L 47/35* (2013.01)
USPC ........................................ 370/235

(58) Field of Classification Search
USPC ................................. 370/229, 235
See application file for complete search history.

(56) References Cited

U.S. PATENT DOCUMENTS

| 7,643,417 | B2 * | 1/2010 | Van Nieuwenhuizen ..... 370/232 |
| 7,664,019 | B2 * | 2/2010 | Boyd et al. .................... 370/230 |
| 8,284,796 | B2 * | 10/2012 | Elliot et al. .................... 370/465 |
| 8,493,859 | B2 * | 7/2013 | Elliot et al. .................... 370/235 |
| 2006/0176810 | A1 * | 8/2006 | Kekki ............................ 370/229 |
| 2006/0187836 | A1 * | 8/2006 | Frey et al. ..................... 370/235 |
| 2006/0250962 | A1 | 11/2006 | Chikamatsu |
| 2009/0132400 | A1 * | 5/2009 | Conway .......................... 705/34 |
| 2012/0020218 | A1 * | 1/2012 | Li et al. .......................... 370/235 |

* cited by examiner

*Primary Examiner* — Hassan Kizou
*Assistant Examiner* — Abdullahi Ahmed
(74) *Attorney, Agent, or Firm* — Rothwell, Figg, Ernst & Manbeck, P.C.

(57) ABSTRACT

In one aspect, the invention provides apparatuses and methods for communicating, from one network node to another network node, congestion information. Advantageously, the congestion information may be communicated at a per-packet level so that the node receiving the congestion information may meter the network usage of a user based, at least in part, upon the level of network congestion experienced by each packet sent or received by the user.

12 Claims, 15 Drawing Sheets

CONGESTION-BASED TRAFFIC METERING

CROSS REFERENCE TO RELATED APPLICATION(S)

This application is a 35 U.S.C. §371 National Phase Entry Application from PCT/IB2009/005837, filed Jun. 3, 2009, designating the United States, the disclosure of which are incorporated herein in its entirety by reference.

TECHNICAL FIELD

The present invention relates to the field of networking. In one aspect, the present invention relates to systems and methods for metering data traffic according to network congestion conditions.

BACKGROUND

Typically, a telecommunication network is shared by many users. The resources of the network (e.g., cell number/size, transmission bandwidth and routing/switching capacity) are engineered to handle a given demand with a given quality of service. The demand is typically based on an "average user," the behaviour of which is constructed from a mix of assumptions and measurements. Many tariffs (e.g., flat rates) are set to match the resources consumed by the average user.

The statistical methods used for dimensioning networks and setting tariffs work well as long as user behaviour is relatively homogeneous. If this is not the case, then the result may be congested networks with poor performance and unbalanced tariffs where less active users in effect subsidise more active users.

Several measurements have shown that the degree of activity varies considerably between different users. In more detail, the vast majority of users exhibit low or medium activity, while a small number of users exhibit high or extreme activity. The users exhibiting high or extreme activity (a.k.a., "heavy hitters") pose a potential problem to network operators because such users tend to offset the dimensioning model by flooding the network and creating traffic peaks at the expense of the other uses. In addition to the notion of "heavy hitters," there is the notion of "bad applications," which (at present) typically include file sharing applications that use peer-to-peer protocols. The term "heavy hitter" is often used in this context as well.

The root of the problem presented by "heavy hitters" is the flat rate tariff scheme. An obvious solution is thus to charge each user by the amount of network traffic the user generates, in the same way as telephone use is charged by time. The problem with this solution, however, is that traffic volumes are hard to understand for ordinary users. Hence, the result is an uncertainty about costs which results in ordinary users tending to refrain from using the service at all.

Another option is to impose some sort of upper limit on traffic volume. For example, a user may be allotted a "bucket" of bytes (or any other suitable unit of network data, e.g., a bucket of packets) on a monthly basis. Each user's bucket may be decremented for every unit of data (e.g., byte) transmitted or received. The user reaches the upper limit when the user's bucket becomes empty. The upper limit (i.e. the size of the users bucket) can easily be chosen such that most ordinary users never will hit this upper limit. Heavy hitters may be charged a higher monthly rate in exchange for a larger bucket.

Although buckets are simple and work well in terms of metering, they only indirectly address the problem of congestion. Congestion comes and goes both regularly according to the time of the day and irregularly in a random fashion, while a bucket mechanism counts all bytes in the same way.

This phenomenon is well known in voice networks where operators (partly) solve the problem by applying different tariffs at different times of the day. This solution can be applied to data networks, for example, by decrementing buckets at different rates at different times of the day.

A remaining shortcoming of this solution is that time of day only provides an approximate estimate of congestion rather than a measure of actual congestion. Moreover, users may adapt their habits to any time based scheme, and the changing user behaviors may require continual adjustments to the decrement rates, e.g., changing the time at which a lower "night tariff" is in effect. The continual adjustments required by this solution may work against one of the desired advantages of the flat rate tariff scheme: perceived simplicity.

Additionally, network operators may attempt to mitigate the effects of network congestion using "traffic shaping", that is, intentionally delaying the transmission of some data so that network resources remain or become available for other purposes. For example, a network may assign priority levels to data packets based upon specified criteria, such as the type of application that generated the data or the user associated with the data. The network may assign higher priority to data generated by latency-sensitive applications (e.g., voice over Internet protocol ("VOIP"), interactive games, video conferencing, etc.), and may assign lower priority to data generated by applications that are not significantly affected by latency (e.g., email). The network may also assign higher priority to data generated by or intended for preferred users (e.g., emergency services).

During periods of network congestion, traffic shaping may be used to delay the transmission of low-priority data so that network resources remain or become available for the transmission of higher-priority data. On the other hand, during periods without significant network congestion, it would be preferable to transmit all data without introducing any delays. One shortcoming of current traffic shaping systems is that congestion information is generally acquired indirectly (or not at all). This results in a considerable delay (e.g., 5 to 60 minutes) between a change in congestion conditions and a network operator being notified of the change For example, there may be a delay between the time at which congestion begins and the time at which traffic shaping begins appropriately delaying packets, or there may be a delay between the time at which congestion ends and the time at which traffic shaping stops unnecessarily delaying packets. Furthermore, the methods of indirectly acquiring the congestion information tend to be undesirably complex for a network operator to implement. Document US 2006/176810 (Kekki Sami) (D1) discloses a system and method for providing network congestion notification. Document US 2006/250962 (Chikamatsu Yuichiro) (D2) discloses an "edge switch" that is configured such that the switch will "avoid network congestion by limiting the amount of packets to be transferred onto the network when congestion occurs in the network."

SUMMARY

What is desired are systems and methods for overcoming at least some of the above described problems.

In one aspect, the invention provides apparatuses and methods for communicating, from one network node to another network node, congestion information. Advantageously, the congestion information is communicated at a per-packet level so that the node receiving the congestion information may meter the network usage of a user based, at least in part, upon the level of network congestion experienced by each packet sent or received by the user. That is, the receiving network node (e.g., a gateway) can use the packet level congestion information, for example, to decrement a user's bucket (e.g. increase a traffic counter) by a larger amount if the user is transmitting or receiving packets during periods of network congestion. In some embodiments, the packet level congestion information can be used to indicate the level of network congestion to end users in real time. The packet level congestion information may also be used to adjust traffic shaping algorithms of the network.

The invention provides several advantages. For example, metering the network usage of a user based, at least in part, upon the level of network congestion experienced by each packet sent or received by the user enables the network operator to charge to the user the true marginal costs associated with delivering each packet. The marginal cost of delivering packets in an uncongested network is relatively small, so a user's bucket may be decremented by a relatively small amount for each unit of data (e.g., each packet or byte) transmitted or received during periods of low network congestion. On the other hand, the marginal cost of delivering packets in networks under congestion may be high (because, for example, the network may require additional hardware to accommodate the increased traffic), so a user's bucket may be decremented by a relatively larger amount for each unit of data transmitted and/or received by the user's device during periods of high network congestion. Furthermore, decrementing a user bucket based not only on the amount of data transmitted to or from the user, but also on the per-packet congestion information enables the network operator to reflect the true marginal costs associated with delivering each packet even during periods of anisotropic network congestion (e.g., periods during which the network may be experiencing congestion in a downstream direction while not experiencing congestion in an upstream direction). Other aspects of the invention including using the bidirectional congestion information for other network management purposes, for example traffic shaping and notifying end users of congestion.

Another advantage provided by aspects of the invention is that some embodiments can be implemented within existing standards and require a minimum of implementation effort. This is because these embodiments may use a generally accepted explicit congestion notification (ECN) mechanism, which is already supported by most vendors of intermediate nodes (e.g, routers), but can also be implemented entirely in a gateway node (e.g., a gateway GPRS support node (GGSN)) or base station (e.g., Node B).

Some aspects of the invention provide the further advantage of a robust metering system. By reflecting the true marginal costs of network traffic, users are less able to exploit the system by, for example, adapting their network usage to avoid time-of-day based higher tariffs.

Aspects of the invention also provide the advantage of simple, real time congestion information that can be used for more easily and effectively shaping traffic on the network. Furthermore, aspects of the invention may provide congestion information in different directions (e.g., downstream congestion and upstream congestion) and adjust traffic shaping accordingly.

In one particular aspect, the invention provides a method for metering data traffic. In some embodiments, this method is performed by a network node, such as a gateway. The method may begin by the gateway transmitting to another network node (e.g., a base station) via a communication network a downstream packet comprising application data intended for a user equipment (UE) connected to the other network node. After performing this step, the gateway may receive via the communication network an upstream packet that includes downstream congestion information indicating whether the downstream packet traversed some other network node in the communications network that detected congestion or incipient congestion. The upstream packet may have been transmitted by the other network node towards the gateway or may include a packet that was transmitted by the other network node towards the gateway. After receiving the upstream packet containing the downstream congestion information, the gateway adjusts a traffic counter associated with the UE (e.g. decrements a bucket associated with the UE) by an amount that is based, at least in part, upon (i) the value of the downstream congestion information and (ii) the amount of the application data that was included in the downstream packet. In this manner, the gateway can perform congestion based traffic metering. In some applications, the amount by which the traffic counter is adjusted may be independent of the congestion information or may be dependent on a number of factors. For example, for a premium user or premium application, the traffic counter may be adjusted solely or primarily based on the amount of the application data that was included in the downstream packet (or other parameters) or not at all. Thus, the amount by which the traffic counter is adjusted could be based on a number of parameters. In other embodiments, a number of different traffic counters may be associated with the UE. For example, a UE may have different traffic counters for different traffic classes. For instance, a UE may have one traffic counter that is adjusted based on the amount of real-time traffic (e.g. voice data) sent to or transmitted from the UE and may have another traffic counter that is adjusted based on the amount of non-real time traffic sent to or transmitted from the UE. Additionally, a set of upstream traffic counters and a set of downstream traffic counters may be associated with the UE.

In some embodiments, the downstream packets may be transmitted toward the other network node and received via one or more intermediate support nodes. Likewise, in some embodiments, the upstream packets may be transmitted toward the gateway and received via one or more intermediate support nodes.

In some embodiments, the method for metering data traffic also includes the steps of (1) comparing the traffic counter with a predetermined traffic limit, and (2) in the case that the traffic counter exceeds the predetermined traffic limit, performing a predetermined penalty action. The penalty action may include, for example, assessing a fee to a user of the UE, denying access to a user of the communication network, sending a message to the UE notifying the user that the predetermined traffic limit has been exceeded, adjusting a priority level of traffic associated with he UE, etc. In some embodiments, the method may include a plurality of different predetermined traffic limits and a plurality of different penalty actions, wherein each traffic limit may be associated with one or more of the plurality of different penalty actions.

In some embodiments, the gateway receives the downstream packet prior to transmitting the downstream packet towards the other network node and the gateway transmits the downstream packet to the other network node by creating a second downstream packet having a first header, a second header, and a payload portion. In some embodiments, the payload portion comprises the downstream packet, the first header includes a downstream packet identifier (DPI), and the second header includes an explicit congestion notification (ECN) field for storing congestion information.

In some embodiments, the upstream packet may also comprise upstream congestion information indicating whether the upstream packet traversed a node in the communication network that detected congestion or incipient congestion. For example, in some embodiments the upstream congestion information is stored in a header of the first upstream packet (e.g. encoded in explicit congestion notification (ECN) bits in the header).

In some embodiments, the upstream packet further comprises a payload containing application data transmitted by a user equipment (UE) wirelessly communicating with the other network node. In embodiments wherein the upstream packet comprises both upstream congestion information and application data transmitted from an uploading UE, the method may further include adjusting a traffic counter associated with the uploading UE by an amount, wherein the amount is based, at least in part, upon (i) the value of the upstream congestion information and (ii) the amount of the application data that was included in the upstream packet.

In some embodiments, the downstream packet further comprises a downstream packet identifier that identifies the downstream packet from among a plurality of downstream packets. For example, the downstream packet identifier may be stored in (e.g. encoded in) a port field of a header included in the downstream packet (e.g., a UDP or TCP header included in the downstream packet). In some embodiments, the downstream packet identifier (or an identifier derived from the downstream packet identifier) may also be stored in the upstream packet (e.g. in a port field of a header included in the upstream packet). In some embodiments, the port field of the upstream packet also stores the downstream congestion information.

In another aspect, the present invention provides a method for communicating congestion information to a network node (e.g., a gateway). The method may be performed by a base station. The method may start with the base station receiving, via a communication network, a downstream packet transmitted from the network node. The downstream packet may include application data intended for a user equipment (UE). After receiving the downstream packet, the base station may receive a data packet transmitted from the UE (or a different UE). After receiving the data packet transmitted by the UE, the base station may transmit an upstream packet towards the network node via the communication network. Advantageously, the upstream packet includes (a) downstream congestion information that indicates whether the downstream packet traversed a node in the communication network that detected congestion or incipient congestion and (b) the received data packet. In this manner, the base station can communicate to the network node congestion information that informs the network node as to whether or not the downstream packet experienced congestion. In some embodiments, the downstream congestion information corresponds to the value of Explicit Congestion Notification (ECN) bits in a header of the downstream packet. Also, the upstream packet may include a downstream packet identifier that identifies the downstream packet from among a plurality of downstream packets. The downstream packet identifier may be stored in a port field of a User Datagram Protocol (UPD) or Transmission Control Protocol (TCP) header included in the upstream packet. Likewise, the downstream congestion information may also be stored in the port field. In some embodiments, the base station may receive the downstream packet from a support node and may transmit the upstream packet towards the network node by transmitting the upstream packet towards the support node.

In another aspect, the invention provides an improved gateway. In some embodiments, the improved gateway includes a transmit and receive circuit and a data processing system. The transmit and receive circuit is operable to transmit towards a network node (e.g., base station), via a communication network, a downstream packet that includes application data intended for a user equipment (UE) connected to the network node. The transmit and receive circuit is further operable to receive, via the communication network, an upstream packet that was transmitted by the network node towards the gateway (or includes a packet that was transmitted by the network node towards the gateway). Advantageously, the upstream packet comprises downstream congestion information indicating whether the downstream packet traversed a node in the communications network that detected congestion or incipient congestion. Also, the data processing system is configured such that, as a result of the gateway receiving the upstream packet, the data processing system adjusts a traffic counter associated with the UE. The traffic counter is adjusted by an amount that is based, at least in part, upon (i) the value of the downstream congestion information and (ii) the amount of the application data that was included in the downstream packet. In this manner, the gateway may advantageously meter the network usage of a user based, at least in part, upon the level of network congestion experienced by each packet sent or received by the user.

In another aspect, the invention provides an improved base station. In some embodiments, the improved base station includes a transmit and receive circuit and a data processing system. The transmit and receive circuit is operable to receive, via a communication network, a downstream packet transmitted from a network node (e.g., gateway or support node). The downstream packet may include application data intended for a user equipment (UE). The transmit and receive circuit is further operable to receive a data packet from the UE (or another UE). Advantageously, the data processing system is configured such that, in response to the base station receiving the data packet from the UE, the data processing system generates an upstream packet and causes the transmit and receive circuit to transmit the upstream packet towards the network node via the communication network. Advantageously, the upstream packet includes (1) downstream congestion information indicating whether the downstream packet traversed a node in the communication network that detected congestion or incipient congestion and (b) the data packet. In this manner, the base station can communicate to the network node congestion information that informs the network node as to whether or not the downstream packet experienced congestion. This information can be used by the network node to perform congestion based traffic metering.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
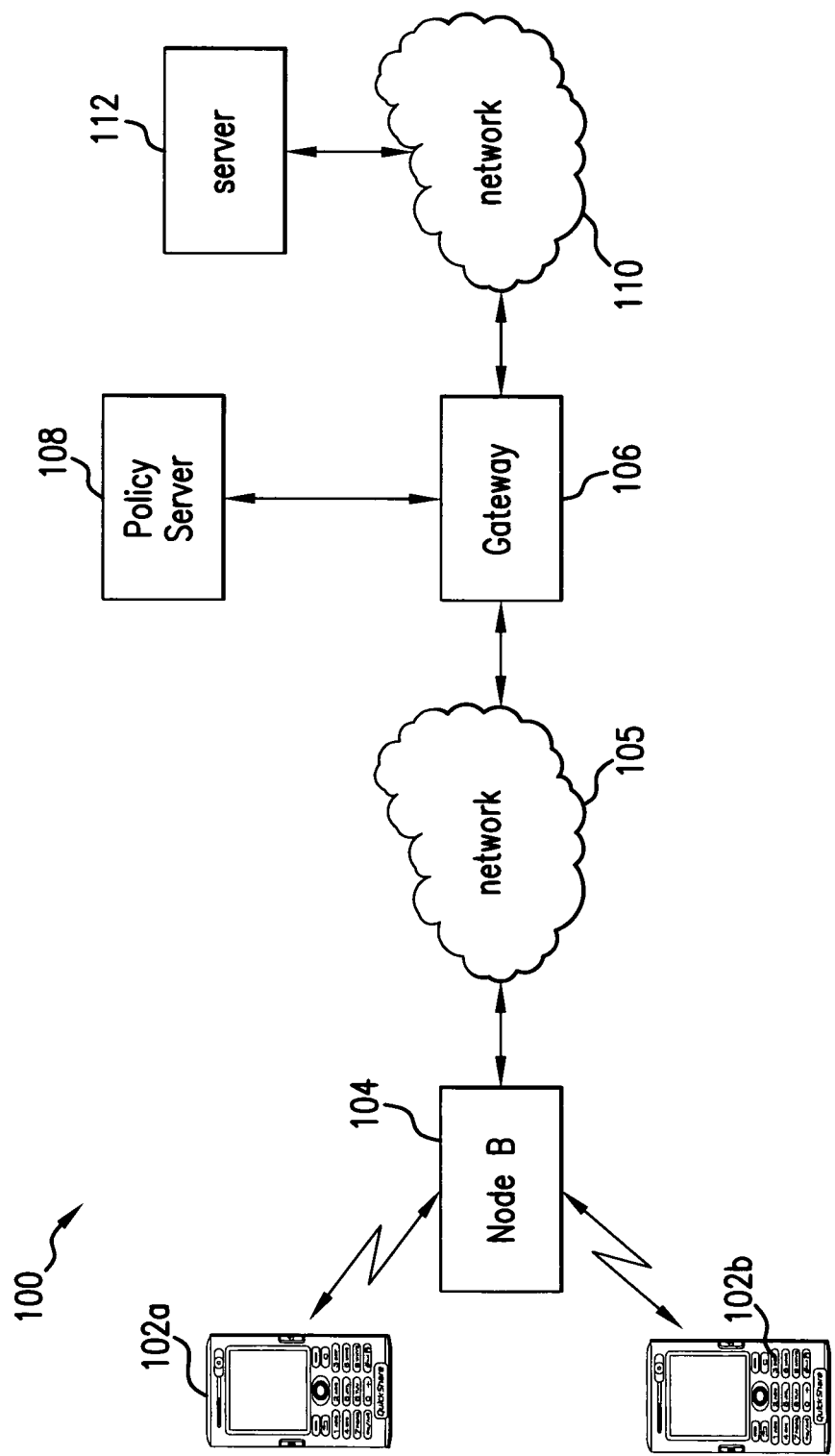
FIG. 1 illustrates a first communication network.

Referring now to FIG. 1, FIG. 1 illustrates a communication system 100 according to an embodiment of the invention. As shown in FIG. 1, in the communication system 100 a user equipment (UE) (e.g., UE 102a) (e.g., mobile phone or other user terminal) may communicate with a network 110 (e.g., the Internet) via a base station 104 (a.k.a., Node B in some environments) and a gateway 106 (e.g., Gateway GPRS Support Node (GGSN) or other gateway, such as a public data network gateway (PDN-GW)). As illustrated in FIG. 1, the gateway 106 may also communicate with a policy server 108 (e.g. a customer account management system such as a Service Aware Policy Control (SAPC)) to receive information about subscription conditions, and in particular about tariff schemes and bucket sizes.

In the communication system 100, gateway 106 functions to (1) receive application data from the network 110 (e.g., from a server 112 connected to network 110, such as a web server, ftp server, or other server or another UE connected to network 110) that is intended for the UE 102a; (2) forward to base station 104 a downstream protocol data unit containing the application data; (3) receive (via the base station 104) application data transmitted from UE 102a (or another UE in communication with base station 104, such as UE 102b) that is intended for the network 110 together with downstream congestion information indicating whether the downstream protocol data unit experienced congestion (i.e., traversed a node that detected congestion or incipient congestion); (4) forward to the network 110 the application data; and (5) meter the network usage of the UE based, at least in part, upon the amount of application data included in the downstream protocol data unit and the downstream congestion information. The above process is illustrated in the flow chart shown in FIG. 2. As used herein the term protocol data unit means unit of data specified by a protocol, which unit of data includes a header containing protocol control information (e.g., address information for routing the protocol data unit) and a possibly a data portion containing application data or another protocol data unit. For short, we shall refer to a protocol data unit simply as a "packet."

Figure 2:
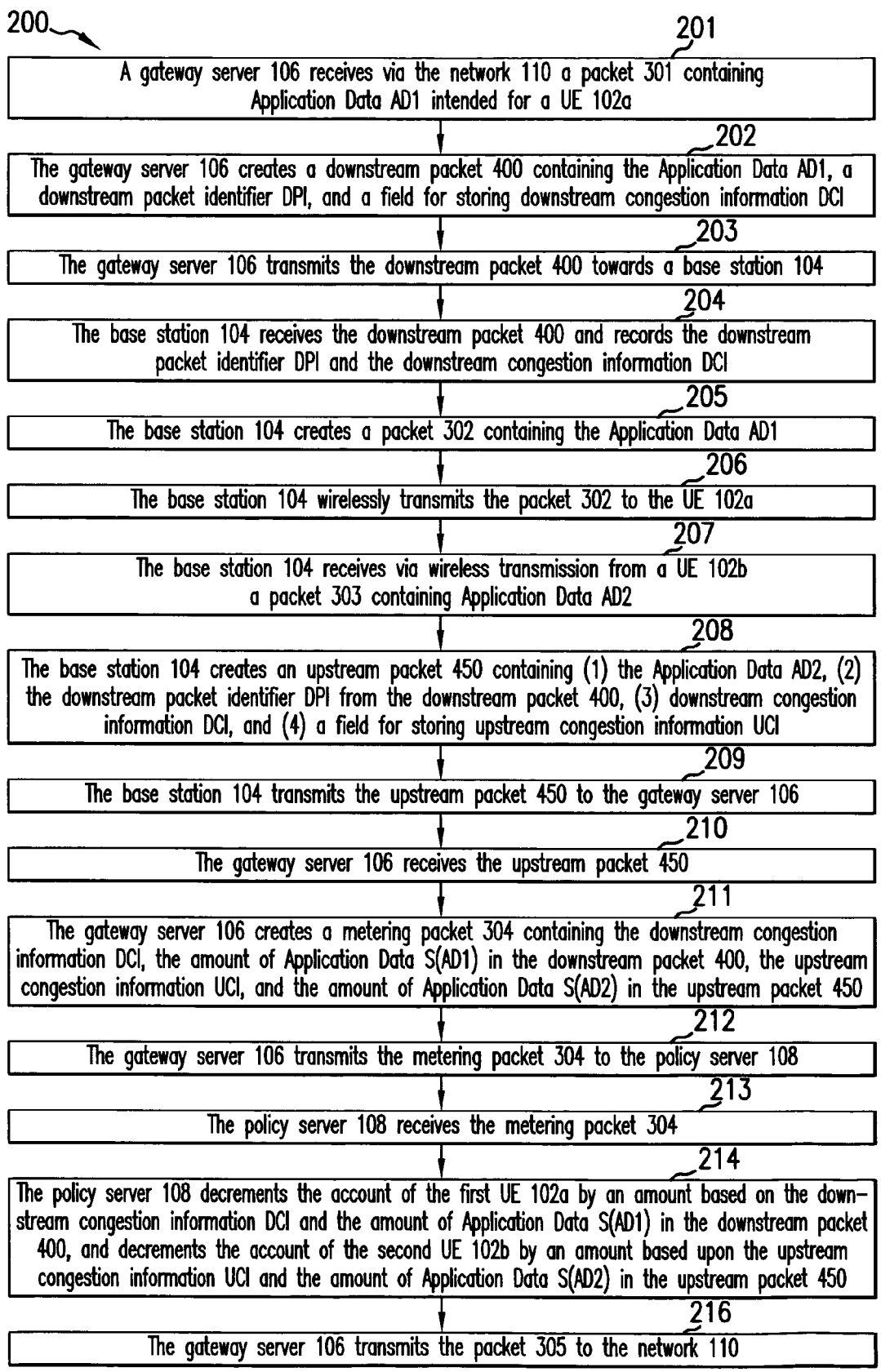
FIG. 2 is a flow chart illustrating a process for metering network traffic.
Figure 3:
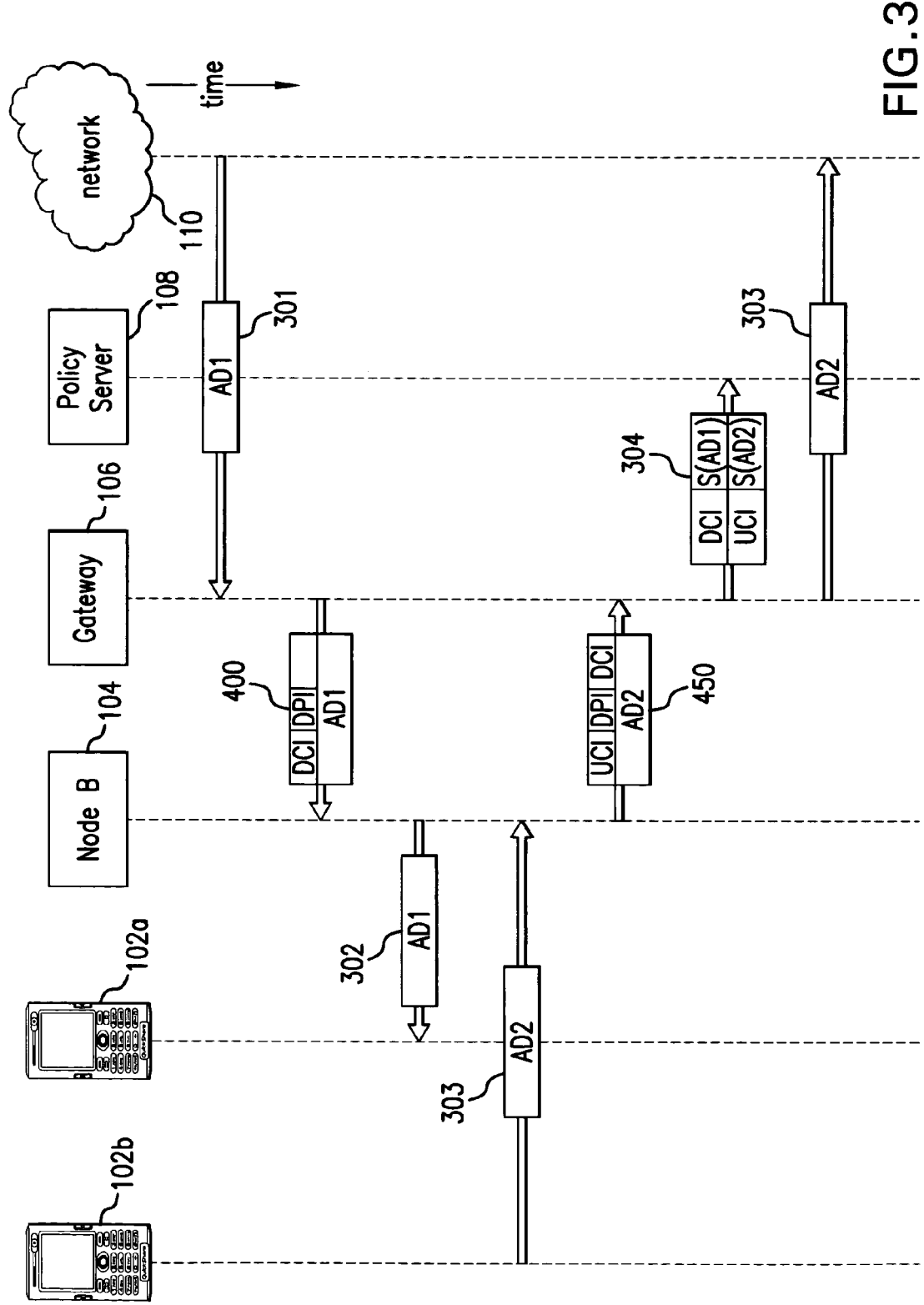
FIG. 3 is a message flow diagram illustrating a process for metering network traffic.

Referring now to FIG. 2, FIG. 2 illustrates a process 200 of metering data traffic according to an embodiment of the invention. Process 200 may begin in step 201, where the gateway 106 receives, via network 110, a downstream packet 301 (see FIG. 3, which shows a message flow diagram according to an embodiment of the invention) containing application data AD1 intended for a UE 102a. For example, the packet 301 may be an IP packet transmitted by server 112 or another device connected to the network 110. In some embodiments, the gateway 106 may perform deep packet inspection on the downstream packet 301. In step 202, the gateway 106 creates a downstream packet 400. Downstream packet 400 may include downstream packet 301.

Figure 4A:
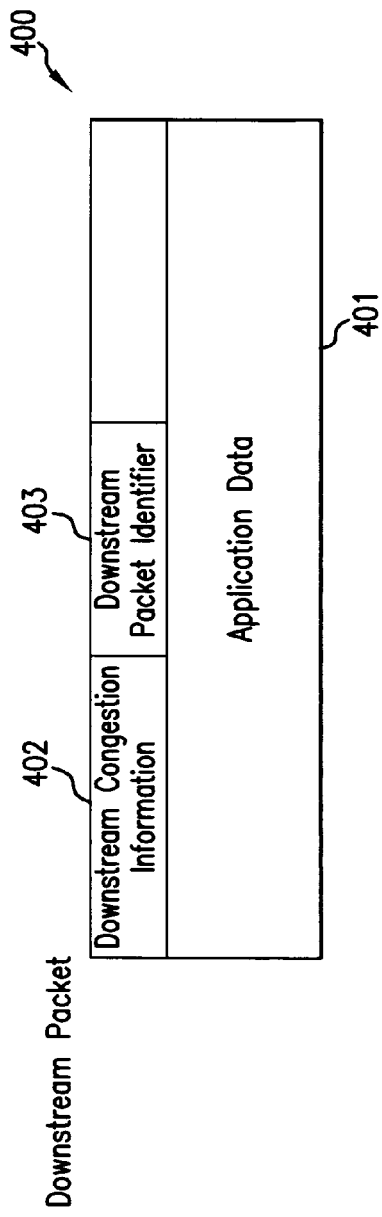
FIG. 4*a* is a bock diagram illustrating a structure of a network packet.

Referring now to FIG. 4a, FIG. 4a illustrates one embodiment of a downstream packet 400. As shown in FIG. 4a, the downstream packet 400 may include a data portion 401 for containing the application data AD1 (or the entire packet 301) and a header section comprising one or more headers (e.g., IP header and UDP or TCP header or ATM header) including at least one header (e.g., an IP header, ATM header) having a downstream congestion information field 402 for storing downstream congestion information (DCI) that indicates whether the downstream packet 400 traversed any node (e.g., router) that detected congestion or incipient congestion. In embodiments where packet 400 is an IP packet, the DCI field 402 may be the explicit congestion notification (ECN) field of the IP header of IP packet 400. Additional aspects of the ECN specification are described in IETF RFC 3168 (2001). One advantage of using the ECN bits to detect network congestion is that ECN is supported by most vendors of intermediate network nodes (e.g. routers).

In some embodiments, a header included in downstream packet 400 (e.g. a UDP header, TCP header or other protocol header) may also include a downstream packet identifier field 403 for storing a downstream packet identifier (DPI) that may be used to identify the downstream packet 400 from among a plurality of downstream packets. In some embodiments, the DPI may be a packet sequence number that is incremented once for every downstream packet transmitted from gateway 106 towards base station 104. In embodiments where packet 400 is a TCP/IP packet or UDP/IP packet, the DPI field 403 may be a port field (e.g., source port field) of the TCP header of the TCP packet (or UDP header of the UDP packet) encapsulated by the IP packet. Because the field in which the DPI may be encoded may be of a fixed length, the DPI may be reset to an initial value after reaching a maximum value. In embodiments where packet 400 is an ATM packet, the DPI field 403 may be a portion of a virtual path identifier (VPI), virtual channel identifier (VCI) or channel identifier (CID) field. In some embodiments, packet 400 includes a tunneling protocol header that includes a tunnel endpoint identifier (TEID) field, and in these embodiments, the DPI field 403 may be a portion of the TEID field.

Referring back to FIG. 2, at step 203 the gateway 106 transmits towards the base station 104 the downstream packet 400, which may include some or all of downstream packet 301. That is, gateway 106 may address the downstream packet 400 to base station 104 or to a support node 801 (see FIG. 8), which may convert downstream packet 400 to another packet and transmit the other packet to base station 104. At step 204 the base station 104 receives the downstream packet 400 and records the DPI and DCI contained in packet 400. At step 205, the base station 104 creates a packet 302 containing the application data AD1, and then at step 206, the base station 104 wirelessly transmits the packet 302 to the UE 102a.

Afterward, at step 207, the base station 104 may receive via wireless transmission from a UE 102 (e.g., UE 102a or UE 102b) a packet 303 containing application data AD2. At step 208, the base station 104 creates an upstream packet 450.

Figure 4B:
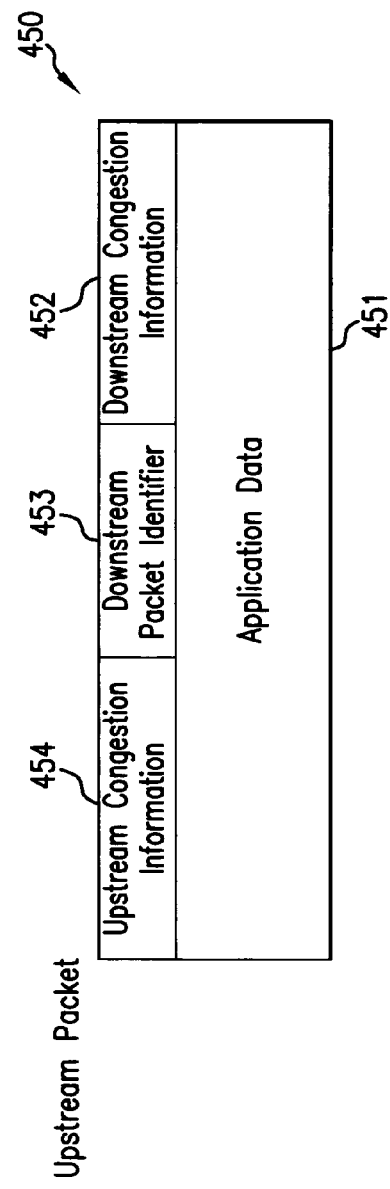
FIG. 4b is a block diagram illustrating a structure of a network packet.

Referring now to FIG. 4b, FIG. 4b illustrates one embodiment of a upstream packet 450. As shown in FIG. 4b, the upstream packet 400 may include a data portion 451 for containing the application data AD2 and a header section comprising one or more headers (e.g., IP header and UDP or TCP header, ATM header) including at least one header (e.g., an IP header, ATM Header) having a DCI field 452 for storing DCI that provides information indicating whether the downstream packet 400 traversed a node (e.g., router or base station 104) that detected congestion or incipient congestion. In some embodiments, DCI field 452 may be a one bit field. In embodiments where packet 450 is an IP packet, preferably the DCI field 452 is not the explicit congestion notification (ECN) field of the IP header of IP packet 450 so that the DCI field 452 will not be altered due to upstream congestion. Additionally, in embodiments where packet 450 is a TCP/IP packet or UDP/IP packet, the DCI field 452 may be a portion of a port field (e.g., source port field) of the TCP header of the TCP packet (or UDP header of the UDP packet) encapsulated by the IP packet. For example, DCI field 452 may be a single bit from the port field. In embodiments where packet 450 is an ATM packet, the DCI field 452 may be a portion of a virtual path identifier (VPI), virtual channel identifier (VCI) or channel identifier (CID) field. In some embodiments, packet 450 includes a tunneling protocol header that includes a tunnel endpoint identifier (TEID) field, and in these embodiments, the DCI field may be a portion of the TEID field.

In some embodiments, a header included in upstream packet 450 (e.g. a UDP header, TCP header or other protocol header) may also include a DPI field 453 for storing the DPI contained in downstream packet 400 or a DPI translated, or otherwise derived from, the DPI contained in downstream packet 400. That is, a DPI equal to the DPI contained in downstream packet 400 may be stored in the DPI field 453. In embodiments where packet 450 is a TCP/IP packet or UDP/IP packet, the DPI field 452 may be a portion of a port field (e.g., source port field) of the TCP header of the TCP packet (or UDP header of the UDP packet) encapsulated by the IP packet. For example, in some embodiments, fifteen bits of the port field may be used to store the DPI, while a sixteenth bit of the port field may be used to store downstream congestion information. In embodiments where packet 450 is an ATM packet, the DPI field 453 may be a portion of a virtual path identifier (VPI), virtual channel identifier (VCI) or channel identifier (CID) field. In some embodiments, packet 450 includes a tunneling protocol header that includes a tunnel endpoint identifier (TEID) field, and in these embodiments, the DPI field may be a portion of the TEID field.

In some embodiments, a header of upstream packet 450 may also include an upstream congestion information (UCI) field 454 for storing information that indicates whether the upstream packet 450 traversed a node (e.g., a router or base station 104) that detected congestion or incipient congestion. In embodiments where packet 450 is an IP packet, the upstream congestion information field 454 may simply be the ECN field in the IP header of the upstream packet 450 so that intermediate nodes that support ECN can modify this field if the intermediate node is experiencing congestion.

Referring back to FIG. 2, in some embodiments, in creating packet 450 in step 208, the base station 104 (1) sets the value of DCI field 452 dependent upon the value of DCI field 402 of packet 400 and (2) sets the value of DPI field 453 equal to the value of DPI field 403 of packet 400 (i.e. the value of DPI field 403 of packet 400 or a value derived therefrom is included in DPI field 453). For example, in the case where DCI field 452 is a one bit field, then base station 104 may set the value of DCI field 452 to "0" if the value of DCI field 402 indicates that packet 400 did not experience congestion and may set the value of the field 452 to "1" if the value of DCI field 402 indicates that packet 400 did experience congestion. As a specific example, if the value of DCI field 402 is set to "11", which, according to the ECN protocol, indicates that packet 400 experienced congestion, then base station 104 will set the DCI field 452 to "1". As is known in the art of active queue management (AQM), a router (or other node) may set of the DCI field to "11" if, for example, at the time the router received packet 400 the router detected congestion or incipient congestion. By including the DPI and DCI in fields 453 and 452, respectively, of upstream packet 450, the upstream packet 450 may be used to: (1) report to gateway 106 downstream congestion information regarding a particular downstream packet (in this case packet 400) and (2) transmit the application data AD2 towards gateway 106.

At step 209, the base station 104 transmits the upstream packet 450 towards the gateway 106. At step 210, the gateway 106 receives the upstream packet 450. In response to receiving the upstream packet 450, the gateway 106 may meter the network traffic of the UEs 102*a* and 102*b*. That is, gateway 106 may adjust a traffic counter (e.g., a downstream traffic counter) associated with UE 102*a* and may adjust a traffic counter (e.g., an upstream traffic counter) associated with UE 102*b* (e.g. decrement their respective buckets). The UE 102*a* may be metered based, at least in part, upon the amount of the application data AD1 contained in the downstream packet 400 and whether the downstream packet 400 traversed a node that detected congestion or incipient congestion. That is, a traffic counter associated with UE 102*a* may be adjusted (e.g., incremented or decremented) by an amount that is a function of the amount of AD1 and a value indicating whether packet 400 experienced congestion. As discussed above, packet 450 may be used to inform gateway 106 that packet 400 experienced congestion. That is, gateway 106 may determine that packet 400 experienced congestion by examining DPI field 453 and DCI field 452 of packet 450. For example, if the value of DPI field 453 matches the value that gateway 106 placed in the DPI field 403 of packet 400, and the DCI field 452 is set to a value of "1", then gateway 106 will know that packet 400 experienced congestion.

Similarly, the UE 102*b* may be metered based, at least in part, upon the amount of the application data AD2 in the upstream packet 450 and whether the upstream packet 450 traversed any nodes that detected congestion or incipient congestion. That is, a traffic counter associated with UE 102*b* may be adjusted (e.g., incremented or decremented) by an amount that is a function of the amount of AD2 and a value indicating whether packet 405 experienced congestion. In some embodiments, the amount by which a traffic counter is adjusted may be independent of the congestion information or may be dependent on a number of factors. For example, for a premium user or premium application, the traffic counter may be adjusted solely or primarily based on the amount of the application data that was included in the downstream/upstream packet (or other parameters). Thus, the amount by which the traffic counter is adjusted could be based on a number of parameters. In other embodiments, a number of different traffic counters may be associated with a UE. For example, a UE may have different traffic counters for different traffic classes. For instance, a UE may have one traffic counter that is adjusted based on the amount of real-time traffic (e.g. voice data) sent to or transmitted from the UE and may have another traffic counter that is adjusted based on the amount of non-real time traffic sent to or transmitted from the UE. Accordingly, in some embodiments, the gateway 106 may first determine the type of traffic that was on the downstream packet so that the gateway 106 can adjust the appropriate traffic counter. This may be accomplished using deep packet inspection techniques.

In some embodiments, gateway 106 may meter the network traffic by creating a metering packet 304 (step 211) and transmitting metering packet 304 to a separate node configured to manage user accounts and metering policies (e.g. SAPC 108) (step 212). In step 213 SAPC 108 receives the metering packet. The metering packet 304 may include: information identifying the value of UCI field 454 of packet 450, information identifying the value of DCI field 452 of packet 450, information identifying the amount of application stored in field 451 (i.e. the amount of application data AD2), information identifying the amount of the application data AD1 contained in the downstream packet 400, and information identifying a user account related to a subscription associated with the UE. The metering packet 304 may also include information identifying the type of application data AD1 and the type of application data AD2. In other embodiments, the gateway 106 may function as the policy server and steps 211-213 may be omitted. At step 214, the policy server 108 (or the gateway 106) may decrement the buckets of the UEs 102a and 102b (i.e., adjusts a traffic counter associated UE 102a and adjusts a traffic counter associated with 102b) according to their respective amounts of application data and reported network congestion. For example, in step 214, policy server 108 (or gateway 106) may increment a downstream traffic counter associated with UE 102a and increment an upstream traffic counter associated with UE 102b. Typically, if a packet experienced congestion, then the traffic counter will be adjusted more than if the packet did not experience congestion. In some embodiments, the traffic counters may be adjusted by different rates corresponding to different degrees of congestion or corresponding to different applications or services associated with the application data 401, 451 contained in the packets. In some embodiments, the packet level congestion information may also be used to indicate the level of network congestion to end users in real time, or to adjust traffic shaping algorithms of the network. When a user's traffic counter exceeds his or her allotted bucket (i.e. when the traffic counter exceeds a predetermined traffic limit), a penalty action may be performed that will modify the user's behavior to reduce congestion. For example, the user may be assessed one or more additional fees, denied access to the network, or notified that the bucket has been exceeded. Additionally, if a user's traffic counter exceeds his or her bucket, further data transmitted by or intended for the user may be assigned a lower priority for traffic shaping purposes. These actions should encourage users to use the network at times of low congestion. As mentioned herein, a set of traffic counters may be associated with UE 102a. Additionally, set of buckets (traffic limits) may be associated with each traffic counter associated with UE 102a. Further, the penalty action that is taken may be dependent on the traffic limit that is exceeded. For instance, if two traffic limits are associated with a particular traffic counter (e.g. a first traffic limit and a second traffic limit that is higher than the first traffic limit), then a first penalty action may be taken when the traffic counter exceeds the first traffic limit and a second, harsher, penalty action may be taken when the traffic counter exceeds the second limit. At step 216, gateway 106 transmits the packet 303 to network 110.

In some embodiments, the downstream congestion information may be relayed to the UE 102, or the upstream congestion information may be relayed to the server 112, or another network node in the network 110. For example, if a connection between the UE 102 and the server 112 utilizes the ECN protocol, in some embodiments the base station 104 may store the downstream congestion information in the ECN field of the packet 302 (e.g., by setting the ECN bits to "11" if the downstream packet 400 experienced congestion) and the gateway 106 may store the upstream congestion information in the ECN field of the packet 303 (e.g., by setting the ECN bits to "11" if the upstream packet 450 experienced congestion). In this way the congestion conditions between the gateway 106 and the base station 104 can be detected by other devices (e.g. the UE 102 or the server 112) in the same manner as congestion occurring elsewhere in the network.

Figure 5A:
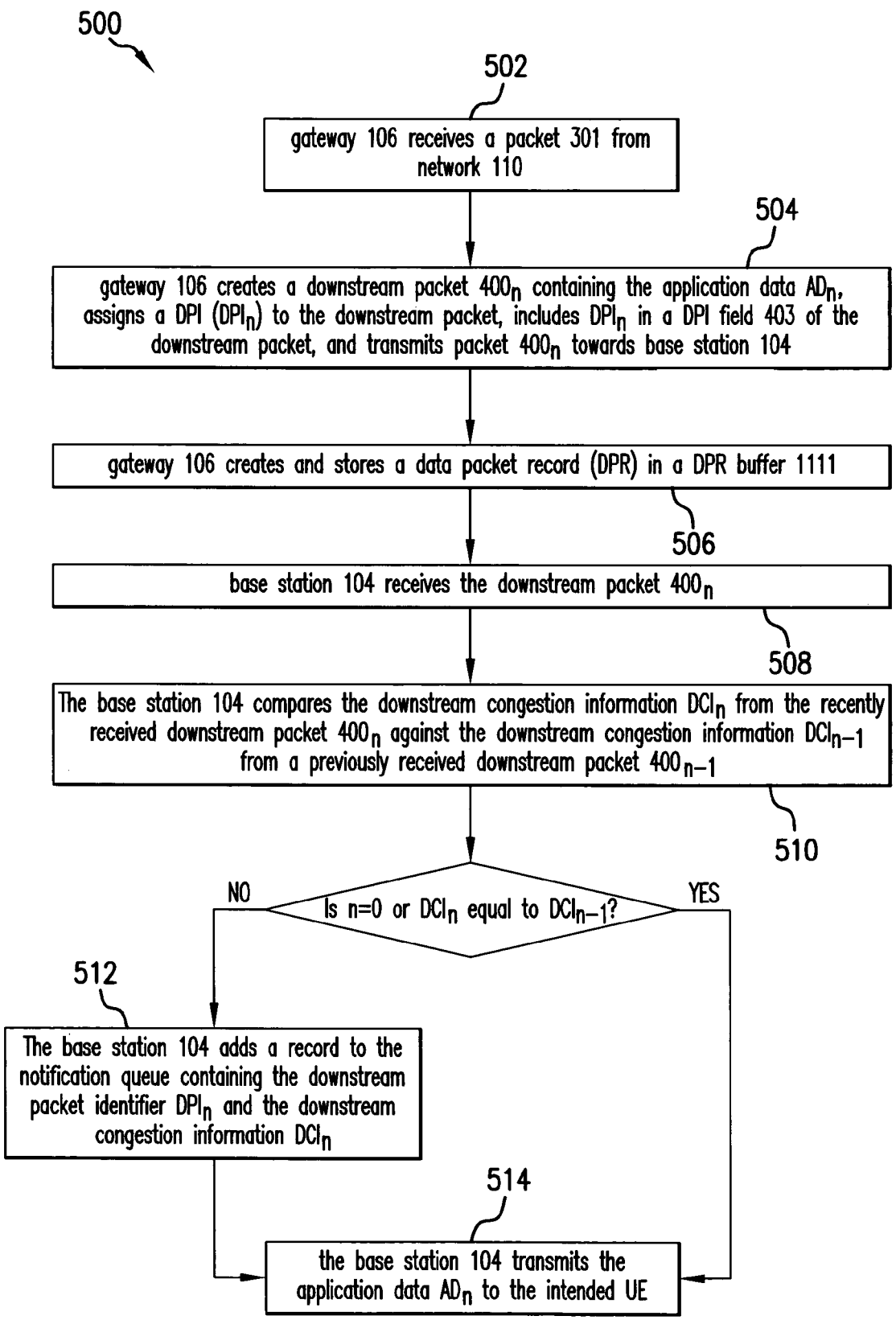
FIG. 5a is a flow chart illustrating a process for recording downstream congestion information
Figure 5B:
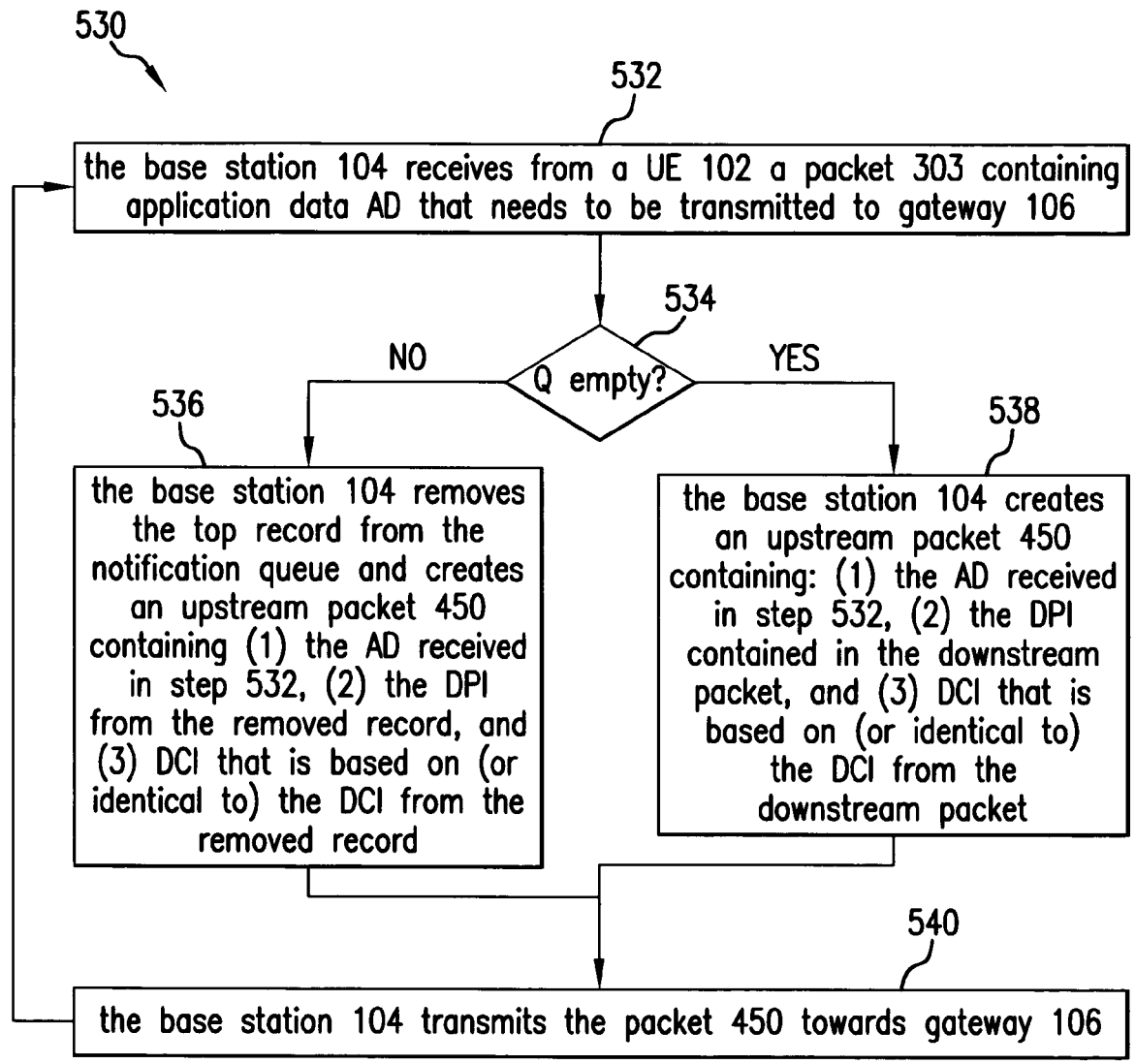
FIG. 5b is a flow chart illustrating a process for reporting downstream congestion information.
Figure 5C:
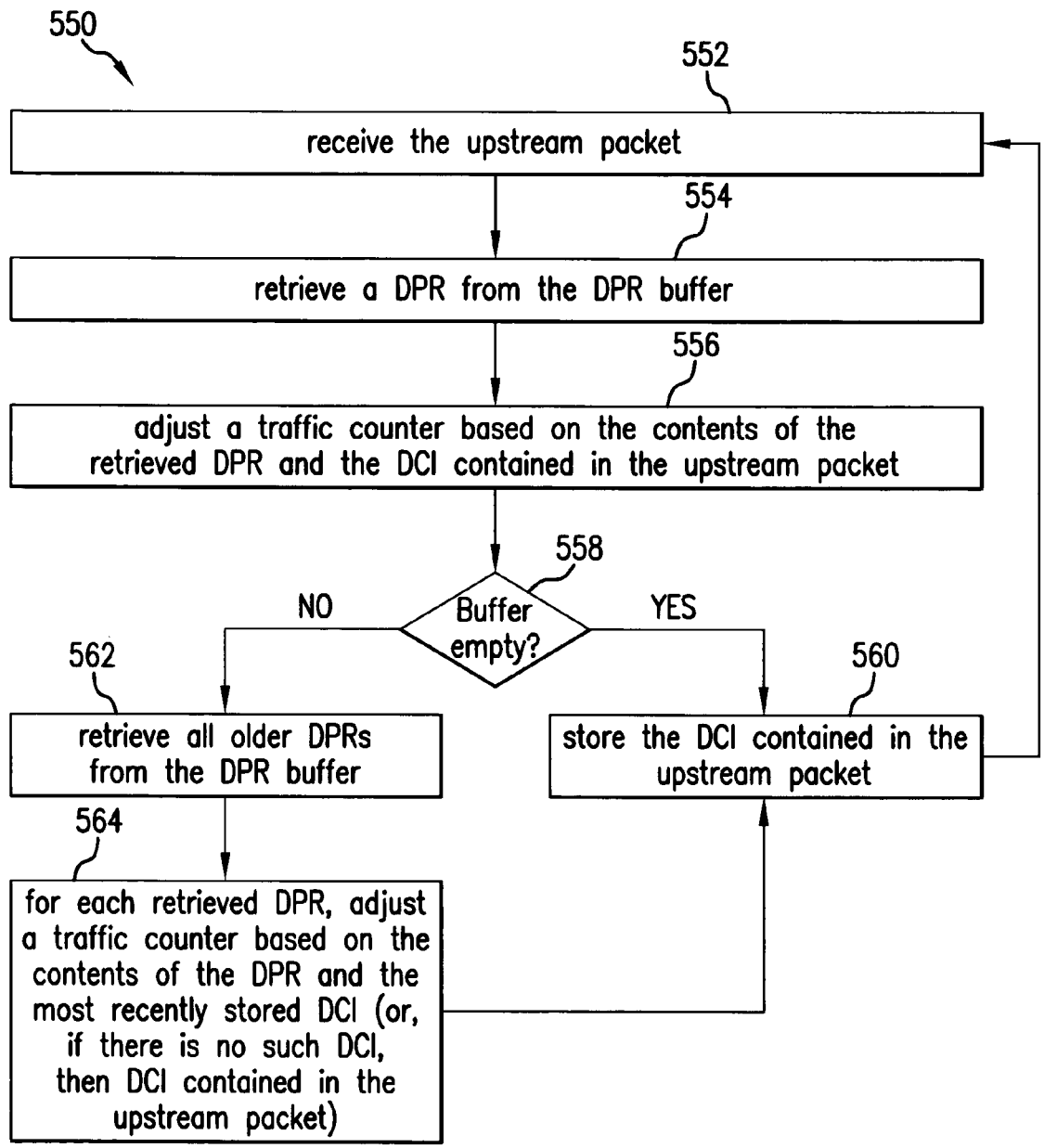
FIG. 5c is a flow chart illustrating a process for congestion-based traffic metering.

In practice, it may occur that the base station 104 receives more downstream packets 400 than the number of upstream packets 450 it transmits. Referring now to FIGS. 5a, 5b and 5c, these figures illustrate processes 500, 530 and 550, respectively, for metering data traffic when the amount of traffic in the downstream direction does not equal the amount of traffic in the upstream direction according to an embodiment of the invention. In some embodiments, base station 104 transmits a single upstream packet 450 that provides downstream congestion information for a plurality of downstream packets 400.

Referring now to FIG. 5a, FIG. 5a illustrates process 500 for recording downstream congestion information for multiple downstream packets 400 from gateway 106. Process 500 may begin at step 502, where gateway 106 receives a packet 301 from network 110. The packet includes application data $AD_n$ intended for a particular UE 102 and information associated with UE 102 (e.g., an address assigned to UE 102). In step 504, gateway 106 creates a downstream packet $400_n$ containing the application data $AD_n$, assigns a DPI ($DPI_n$) to the downstream packet, includes $DPI_n$ in a DPI field 403 of the downstream packet, and transmits packet $400_n$ towards base station 104. In step 506, gateway 106 creates and stores a data packet record (DPR) in a DPR buffer 1111 (see FIG. 11), where the stored DPR contains (1) $DPI_n$, (2) a information indicating the amount of $AD_n$, and (3) the information associated with the UE 102 (e.g., the address assigned to UE 102). The DPR may also contain information identifying the type of the application data (e.g. real-time vs. non-real time). Gateway 106 may determine the type using a deep packet inspection technique.

In step 508, base station 104 receives the downstream packet $400_n$ transmitted from gateway 106. As described above, packet $400_n$ includes a downstream packet identifier $DPI_n$, downstream congestion information $DCI_n$, and application data $AD_n$. At step 510, the base station 104 compares the downstream congestion information $DCI_n$ from the recently received downstream packet $400_n$ against the downstream congestion information $DCI_{n-1}$ from a previously received downstream packet $400_{n-1}$. In the case that (a) n equals 0 (i.e., this is the first downstream packet received so that there is no "previous" packet) or (b) n is greater than 0 and the downstream congestion information $DCI_n$ is different than the downstream congestion information $DCI_{n-1}$, then, at step 512, the base station 104 will create a data record containing (a) the downstream packet identifier $DPI_n$ from downstream packet $400_n$ and (b) the downstream congestion information $DCI_n$ from downstream packet $400_n$ (or data derived therefrom) and add this record to a notification queue 1311 (see FIG. 13) (e.g., a first-in first-out (FIFO) queue). In the case that the downstream congestion information $DCI_n$ is the same as the downstream congestion information $DCI_{n-1}$, the process 500 will not add a record to the notification queue. In either case, the process 500 continues to step 514, where the base station 104 transmits the application data $AD_n$ to the intended UE. In some embodiments, base station 104 may be in communication with multiple gateways 106. In these embodiments, base station 104 may maintain a notification queue for each gateway 106 with which it is in communication.

Referring now to FIG. 5b, FIG. 5b illustrates a process 530 for reporting downstream congestion information for multiple downstream packets 400 using a single upstream packet 450. Process 530 may begin in step 532, where the base station 104 receives from a UE 102 a packet 303 containing application data AD that needs to be transmitted to gateway 106 for relay to network 110. At step 534, the base station 104 determines whether the notification queue associated with the gateway 106 is empty.

In the case that the notification queue is not empty, at step 536 the base station 104 removes the top record from the notification queue and creates an upstream packet 450 containing (1) the application data AD received in step 532, (2) the downstream packet identifier DPI from the removed record (or a DPI derived therefrom), and (3) downstream congestion information DCI that is based on (or identical to) the DCI from the removed record. For example, if the DCI from the removed record indicates that congestion was detected, then, in the case the DCI field 452 is a one bit field, the base station 104 will set the DCI field 452 of upstream packet 450 to a value of "1." Similarly, if, for example, the DCI from the removed record indicates that no congestion was detected, then, in the case the DCI field 452 is a one bit field, the base station 104 will set the DCI field 452 of upstream packet 450 to a value of "0."

In the case that the notification queue is empty, at step 538 the base station 104 creates an upstream packet 450 containing: (1) the application data AD received in step 532, (2) the downstream packet identifier DPI contained in the most recently received downstream packet received from gateway 106 (or a DPI derived therefrom), and (3) downstream congestion information DCI that is based on (or identical to) the DCI from the most recently received downstream packet received from gateway 106. In either case, the process 530 will proceed to step 540 at which the upstream packet 450 is transmitted towards the gateway 106.

Referring now to FIG. 5c, FIG. 5c illustrates a process 550 for congestion-based traffic metering. Process 550 may begin in step 552, where the gateway 106 receives the upstream packet 450 transmitted in step 540. As discussed herein, packet 450 may include a DPI that identifies a downstream packet that was transmitted by gateway 106 and may include DCI that indicates whether the identified downstream packet experienced congestion. For example, in the case where there are more upstream packets than downstream packets, an upstream packet may not include a DPI and DCI. or may include the most recent DPI and DCI.

In step 554, assuming the upstream packet includes a DPI and DCI, gateway 106 retrieves from the DPR buffer the DPR that matches the DPI contained in the upstream packet received in step 552 and then deletes the DPR from the buffer.

In step 556, gateway 106 adjusts a traffic counter associated with the UE identified by information contained in the retrieved DPR. More specifically, in some embodiments, the traffic counter is adjusted based on (a) the information contained in the DPR that identifies the amount of application data that was included in the downstream packet identified by the DPI contained in the retrieved DPR and (b) the DCI contained in the upstream packet received in step 552. Preferably, the traffic counter is adjusted more if the DCI indicates that the identified downstream packet experienced congestion than if the DCI indicates that the identified downstream packet did not experience congestion. As discussed above, gateway 106 may adjust the traffic counter directly or may adjust the traffic counter by transmitting a message to policy server 108, which in response to the message adjusts the traffic counter. As also mentioned above, in some embodiments, the amount by which the traffic counter is adjusted may be independent of the congestion information. For example, for a premium user or premium application, the traffic counter may be adjusted solely based on the amount of the application data that was included in the downstream packet. Thus, the amount by which the traffic counter is adjusted could be based on a number of parameters. In other embodiments, a number of different traffic counters may be associated with the UE. For example, a UE may have different traffic counters for different traffic classes. For instance, a UE may have one traffic counter that is adjusted based on the amount of real-time traffic (e.g. voice data) sent to or transmitted from the UE and may have another traffic counter that is adjusted based on the amount of non-real time traffic sent to or transmitted from the UE. Accordingly, in some embodiments, in step 556, the gateway 106 may first determine the type of traffic that was on the downstream packet so that the gateway 106 can adjust the appropriate traffic counter. This traffic type information may be contained in the DPR.

In step 558, gateway 106 determines whether the DPR buffer is empty. If it is, process 550 proceeds to step 560, otherwise process 550 proceeds to step 562.

In step 560, gateway 106 stores in a storage unit the DCI included in the upstream packet received in step 522.

In step 562, gateway retrieves from the DPR buffer all of the DPRs that contain a DPI identifying a packet transmitted earlier than the packet identified by the DPI contained in the upstream packet received in step 552. After retrieving these DPRs from the DPR buffer, gateway 106 deletes the retrieved DPRs from the DPR buffer.

In step 564, gateway 106, for each DPR retrieved in step 562, adjusts a traffic counter associated with the UE identified by information in the retrieved DPR based on the DCI stored the last time step 560 was performed. If there is no such stored DCI, then the adjustment to the traffic counter may be a function of the DCI included in the upstream packet received in step 522. After step 564, the process proceeds to step 560.

In the above manner, gateway 106 can adjust multiple traffic counters based on a single upstream packet. That is, when the gateway 106 receives an upstream packet 450 reporting the downstream congestion information DCI for a downstream packet identified by the downstream packet identifier $DPI_{m-x}$, followed by another upstream packet 450 reporting the downstream congestion information $DCI_m$ for the downstream packet identified by the downstream packet identifier $DPI_m$, the gateway 106 may infer that every downstream packet 400 identified by a downstream packet identifier DPI in between and including $DPI_{m-(x+1)}$ and $DPI_{m-1}$ contained a downstream congestion information DCI equal to the downstream congestion information $DCI_{m-x}$ of the downstream packet $400_{m-x}$ identified by the downstream packet identifier $DPI_{m-x}$. This is because base station 104, as described above with reference to process 500, adds an entry to the notification queue only when there is a change in congestion status.

Figure 6:
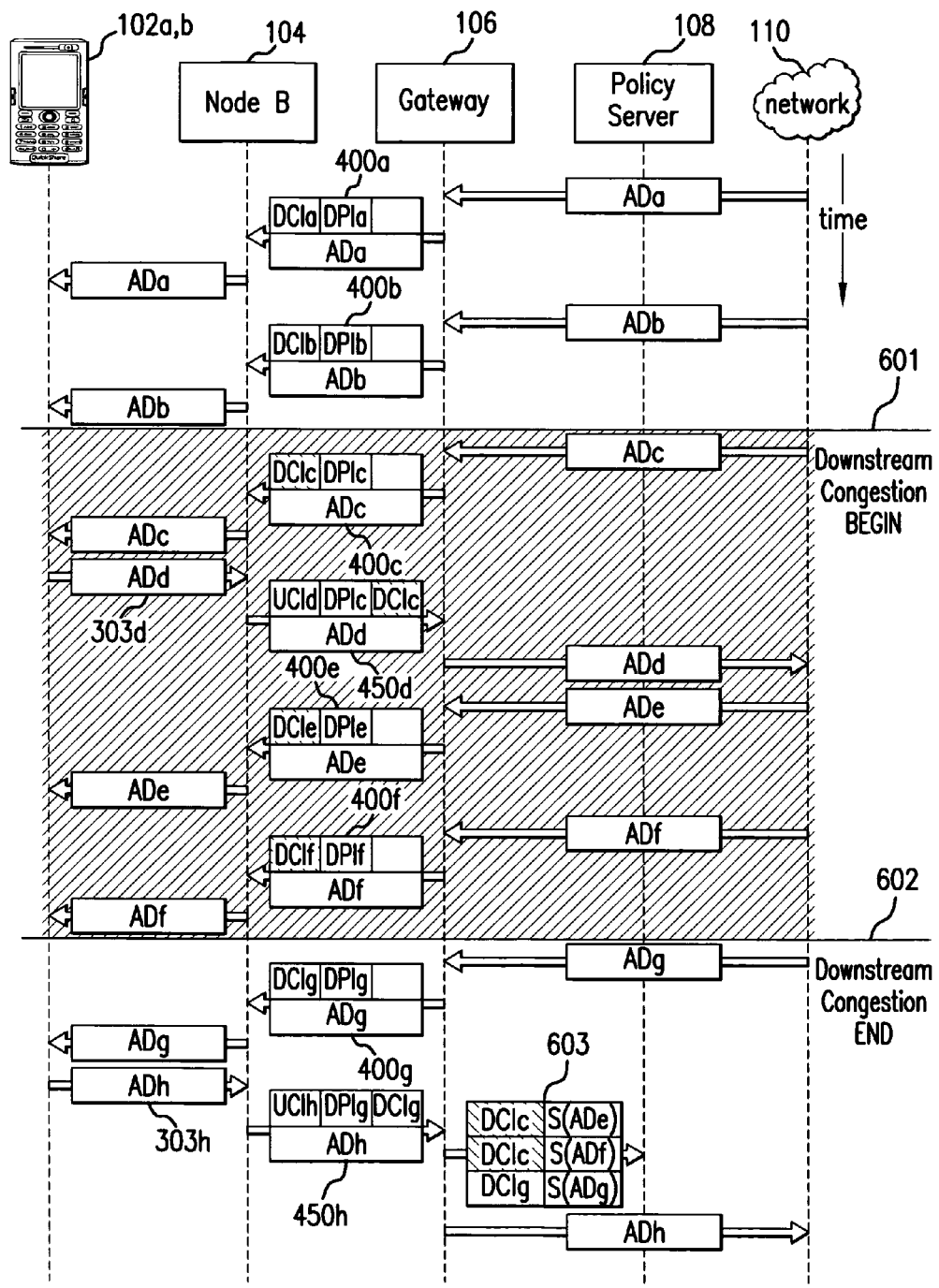
FIG. 6 is a message flow diagram illustrating an embodiment of the invention

Referring now to FIG. 6, FIG. 6 is a message flow diagram illustrating some embodiments of the invention wherein a single upstream packet 450 conveys downstream congestion information DCI for multiple downstream packets 400. As described in the foregoing embodiments, additional messages may be included that are omitted from FIG. 6 for clarity. As illustrated in FIG. 6, the downstream packets 400a and 400b are transmitted during a period of no network congestion, and so arrive at the base station 104 with downstream congestion information DCIa and DCIb indicating no network congestion.

At time 601, the network 105 between the gateway 106 and the base station 104 begins to experience congestion in the downstream direction. When the base station 104 receives the downstream packet 400c, it detects that the downstream congestion information DCIc is different than the downstream congestion information DCIb and adds a record to the notification queue comprising the downstream packet identifier DPIc and the downstream congestion information DCIc from the downstream packet 400c. Subsequently, the base station 104 receives an upstream packet 303d from a UE 102. Because the record associated with the downstream packet 400c is next on the notification queue, the base station 104 creates an upstream packet 450d including the downstream packet identifier DPIc and downstream congestion information DCIc from the downstream packet 400c and transmits the upstream packet 450d to the gateway 106.

Subsequently, downstream packets 400e and 400f are received by the base station 104. Because these downstream packets 400e and 400f were transmitted during a period of network congestion, they contain downstream congestion information DCIe and DCIf indicating downstream network congestion. Because the downstream congestion information DCIe and DCIf is equal to the downstream congestion information DCIc, the base station 104 does not add records to the notification queue corresponding to downstream packets 400e and 400f.

At time 602, the downstream congestion over network 105 between the gateway 106 and the base station 104 ends. Subsequently, a downstream packet 400g is received by the base station 104 including a downstream congestion information field DCIg indicating no network congestion. When the base station 104 receives the downstream packet 400g, it detects that the downstream congestion information DCIg is different than the downstream congestion information DCIf and adds a record to the notification queue comprising the downstream packet identifier DPIg and the downstream congestion information DCIg from the downstream packet 400g. Subsequently, the base station 104 receives an upstream packet 303h from a UE 102. Because the record associated with the downstream packet 400g is next on the notification queue, the base station 104 creates an upstream packet 450h including the downstream packet identifier DPIg and downstream congestion information DCIg from the downstream packet 400g and transmits the upstream packet 450h to the gateway 106.

After the gateway 106 receives the upstream packets 450d (reporting the downstream congestion information DCIc and downstream packet identifier DPIc) and 450h (reporting the downstream congestion information DCIg and downstream packet identifier DPIg), it can infer the downstream congestion information of every downstream packet 400 having a downstream packet identification DPI in between DPIc and DPIg (e.g., downstream packets 400e and 400f). Because the base station 104 adds a record to the notification queue for any downstream packet $400_n$ having different downstream congestion information $DCI_n$ than its predecessor $400_{n-1}$, and the gateway 106 did not receive a notification corresponding to downstream packets 400e and 400f, the gateway 106 may infer that the downstream congestion information DCI for downstream packets 400e and 400f was not different than the downstream congestion information DCIc for the previously reported downstream packet 400c. Based on this inference, the gateway 106 can create a metering packet 603 comprising the downstream congestion information DCIg of downstream packet 400g directly reported in upstream packet 450h, and the inferred downstream congestion information DCIc for downstream packets 400e and 400f.

If downstream congestion information DCI is only reported when the congestion state changes and the network congestion state does not change for a long period of time, gateway 106 may need to store a significant amount of downstream packet information (e.g. a large set of DPRs). For example, if 1,000 downstream packets are transmitted during a period of no network congestion, the gateway node 106 may need to store a DPR for each of the 1,000 downstream packets until the gateway 106 receives an upstream packet 450 that reports downstream congestion information. To avoid this requirement, in some embodiments the base station 104 may transmit an upstream packet 450 containing recent downstream congestion information even when the downstream congestion state has not changed, which is illustrated in process 530.

Figure 7:
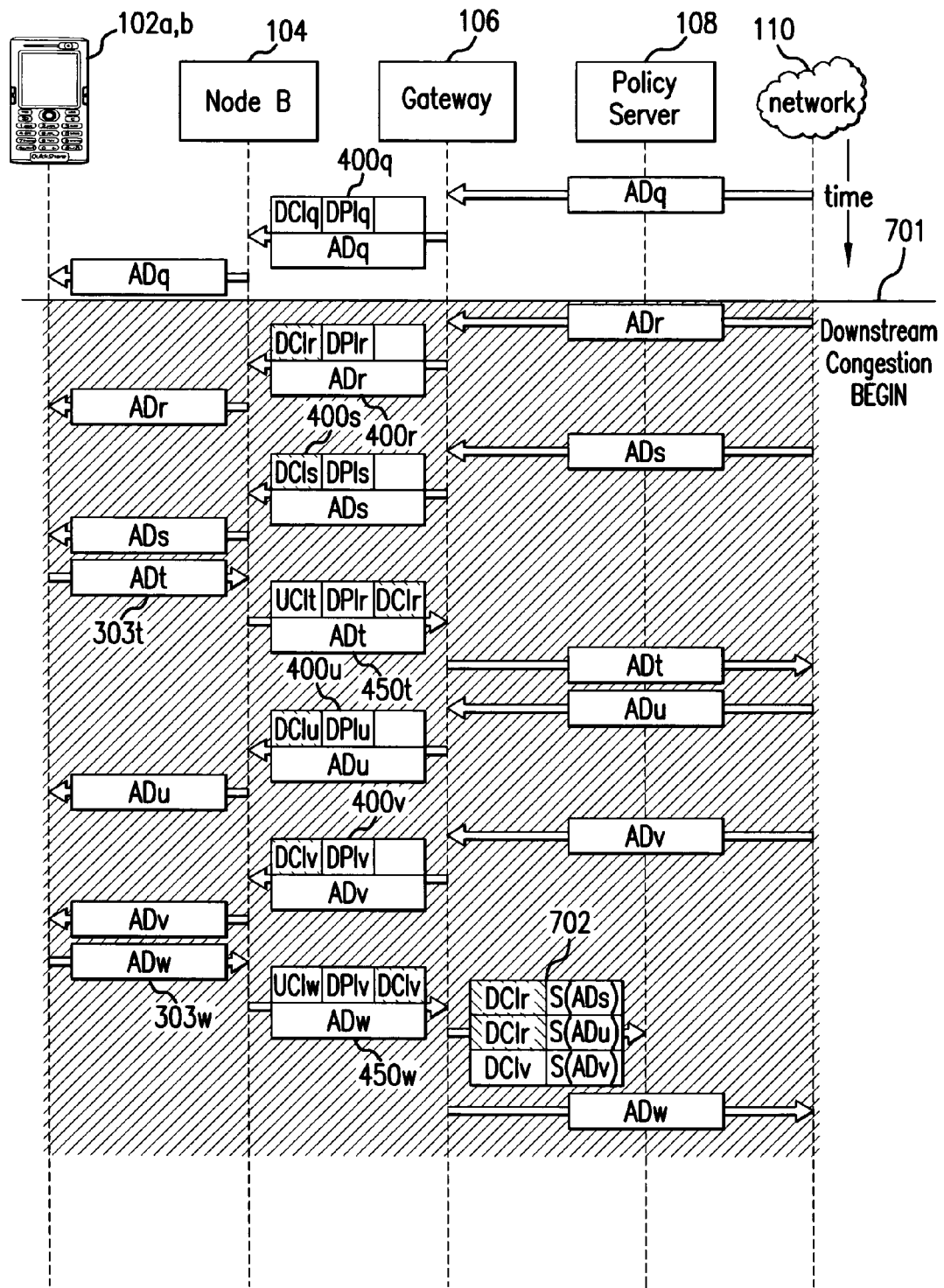
FIG. 7 is a message flow diagram illustrating an embodiment of the invention

Referring now to FIG. 7, FIG. 7 is a message flow diagram illustrating some embodiments of the invention wherein the base station 104 receives an upstream packet 303 when the notification queue is empty. As described in the foregoing embodiments, additional messages may be included that are omitted from FIG. 7 for clarity. As illustrated in FIG. 7, the downstream packet 400q is transmitted during a period of no network congestion, and so arrives at the base station 104 with downstream congestion information DCIq indicating no network congestion.

At time 701, the network 105 between the gateway 106 and the base station 104 begins to experience congestion in the downstream direction. When the base station 104 receives the downstream packet 400r, it detects that the downstream congestion information DCIr is different than the downstream congestion information DCIq and adds a record to the notification queue comprising the downstream packet identifier DPIr and the downstream congestion information DCIr from the downstream packet 400r.

Next, downstream packet 400s is received by the base station 104. Because these downstream packets 400s was transmitted during a period of network congestion, it contains contain downstream congestion information DCIs indicating downstream network congestion. Because the downstream congestion information DCIs is equal to the downstream congestion information DCIr, the base station 104 does not add a record to the notification queue corresponding to downstream packet 400s.

Subsequently, the base station 104 receives a packet 303t from a UE 102. Because the record associated with the downstream packet 400r is next on the notification queue, the base station 104 creates an upstream packet 450t including the downstream packet identifier DPIr and downstream congestion information DCIr from the downstream packet 400r and transmits the upstream packet 450t to the gateway 106.

After the upstream packet 450t has been transmitted, the base station 104 receives additional downstream packets 400u and 400v. Because these downstream packets 400u and 400v were transmitted during a period of network congestion, they contain downstream congestion information DCIu and DCIv indicating the presence of downstream network congestion. Because the downstream congestion information DCIu and DCIv is equal to the downstream congestion information DCIr, the base station 104 does not add records to the notification queue corresponding to downstream packets 400u and 400v.

Subsequently, the base station 104 receives a packet 303w from a UE 102. Because the notification queue is empty, the base station 104 creates an upstream packet 450w including the downstream packet identifier DPIv and downstream congestion information DCIv from the most recently received downstream packet 400v and transmits the upstream packet 450w to the gateway 106.

After the gateway 106 receives the upstream packets 450t (reporting the downstream congestion information DCIr and downstream packet identifier DPIr) and 450w (reporting the downstream congestion information DCIv and downstream packet identifier DPIv), it can infer the downstream congestion information of every downstream packet 400 having a downstream packet identification DPI in between DPIr and DPIv (e.g., downstream packets 400s and 400u). Because the base station 104 adds a record to the notification queue for any downstream packet $400_n$ having different downstream congestion information $DCI_n$ than its predecessor $400_{n-1}$, and the gateway 106 did not receive a notification corresponding to downstream packets 400s and 400u, the gateway 106 may infer that the downstream congestion information DCI for downstream packets 400s and 400u was not different than the downstream congestion information DCIr for the previously reported downstream packet 400r. Based on this inference, the gateway 106 can create a metering packet 702 comprising the downstream congestion information DCIv of downstream packet 400v directly reported in upstream packet 450w, and the inferred downstream congestion information DCIr for downstream packets 400s and 400u.

The gateway 106 may also be required to store DPR information for a large number of packets if the gateway 106 does not receive any upstream packets 450 over an extended period of time. This may occur if the base station 106 does not receive any packets 303 from the UEs 102. In some embodiments, the base station 104 may reduce the storage requirements of the gateway 106 by transmitting an empty upload packet 450 (i.e., a packet that does not contain any application data), even if the base station 106 has not received any packet 303 from a UE. In this embodiment, the process 530 may begin at step 534 after a predetermined condition occurs, and then construct and transmit an upstream packet 450 as described above. In some embodiments, the predetermined condition may be detecting a predetermined interval of time during which no upstream packets are transmitted. In other embodiments, the predetermined condition may be detecting that a predetermined number of downstream packets have been received since the last upstream packet was transmitted. In still further embodiments, the predetermined condition may be detecting that the notification queue exceeds a certain number of records.

Figure 8:
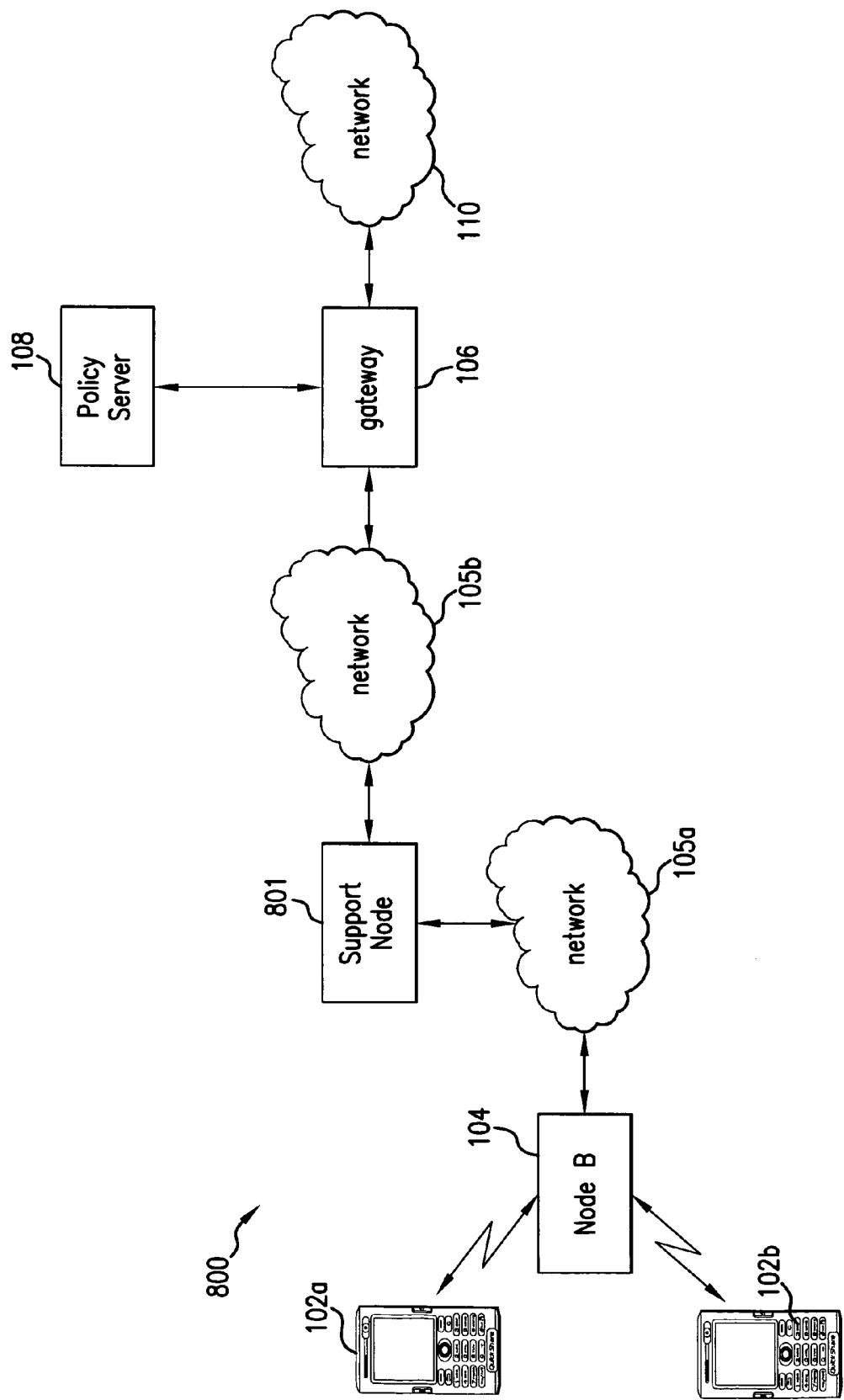
FIG. 8 illustrates a first communication network.

Referring now to FIG. 8, FIG. 8 illustrates a communication system 800 according to another embodiment of the invention. System 800 is the same as system 100 with the exception that the base station 104 and gateway 106 communicate via a support node 801 (e.g., Serving GPRS Support Node (SGSN)).

Figure 9:
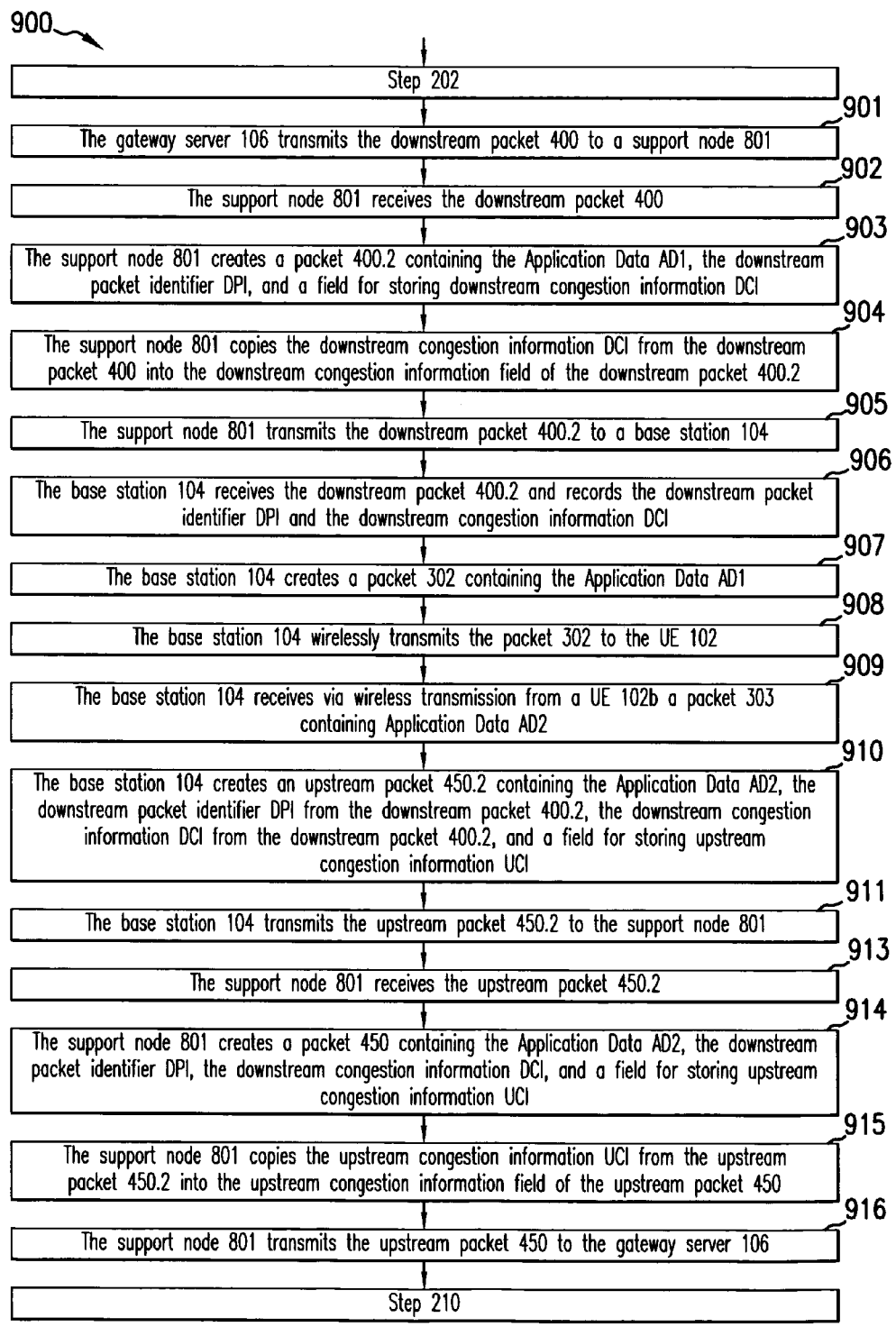
FIG. 9 is a flow chart illustrating a process for communicating congestion information between network nodes
Figure 10:
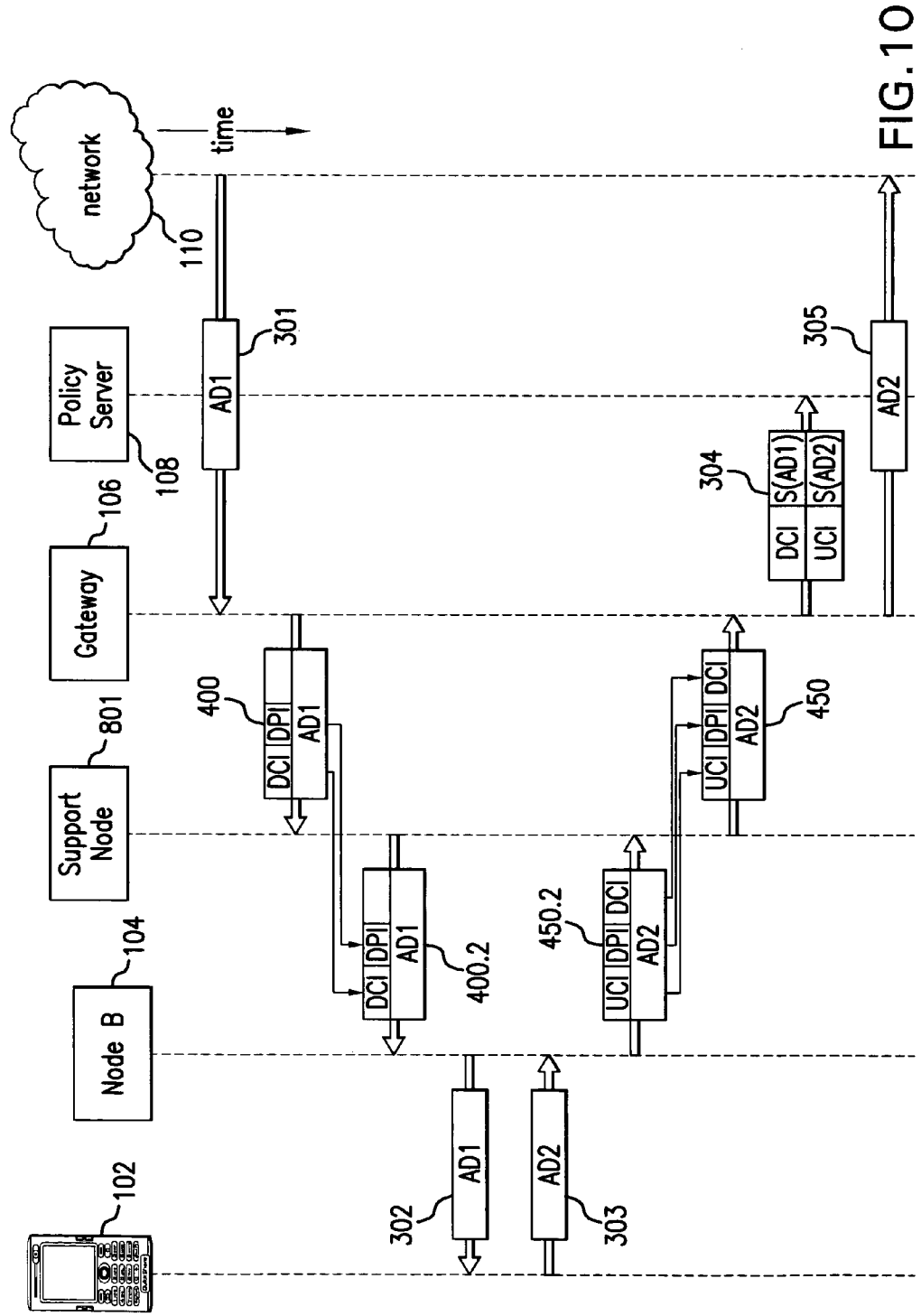
FIG. 10 is a message flow diagram illustrating an embodiment of a support node

Referring now to FIG. 9, FIG. 9 illustrates a process 900 of communicating bidirectional congestion information between an upstream node (e.g. a gateway node 106) and a downstream node (e.g. a base station 104). Process 900 may begin after step 202 in which the gateway 106 creates a first downstream packet 400 (see FIG. 10, which shows a message flow diagram according to an embodiment of the invention). At step 901, the gateway 106 transmits the downstream packet 400 to a support node 801. At step 902, the support node 801 receives the downstream packet 400. At step 903, the support node 801 creates a packet 400.2 (e.g., UDP/IP packet or ATM cell) containing the application data AD1, the downstream packet identifier DPI, and a field for storing downstream congestion information DCI. At step 904, the support node 801 copies the downstream congestion information DCI from the downstream packet 400 into the downstream congestion information field of the downstream packet 400.2, and at step 905 the support node 801 transmits the downstream packet 400.2 to the base station 104.

At step 906, the base station 104 receives the downstream packet 400.2 and records the downstream packet identifier DPI and the downstream congestion information DCI. At step 907 the base station 104 creates a packet 302 containing the application data AD1, and then at step 908 the base station 104 wirelessly transmits the packet 302 to the UE 102.

Afterward, at step 909, the base station 104 may receive via wireless transmission from a UE 102 a packet 303 containing application data AD2. At step 910, the base station 104 creates an upstream packet 450.2 including the downstream congestion information DCI from the downstream packet 400.2. In some embodiments, the upstream packet 450.2 may also include a downstream packet identifier and an upload congestion information field. At step 911, the base station 104 transmits the upstream packet 450.2 to the support node 801, and at step 912 the support node 801 receives the upstream packet 450.2.

At step 913, the support node 801 creates a packet 450 containing the application data AD2, the downstream packet identifier DPI, the downstream congestion information DCI, and a field for storing upstream congestion information UCI. At step 914, the support node 801 copies the upstream congestion information UCI from the upstream packet 450.2 into the upstream congestion information field of the upstream packet 450. Then, at step 915, the upstream packet 450 is transmitted to the gateway 106. After the upstream packet 450 is transmitted to the gateway 106, the process 900 continues with step 210.

In some embodiments, the downstream packets 400 and the upstream packets 450 may be of a different protocol than the downstream packets 400.2 and the upstream packets 450.2. For example, in some embodiments the downstream packets 400 and the upstream packets 450 comply with the user datagram protocol (UDP), while the downstream packets 400.2 and the upstream packets 450.2 conform to the asynchronous transfer mode (ATM) protocol.

Figure 11:
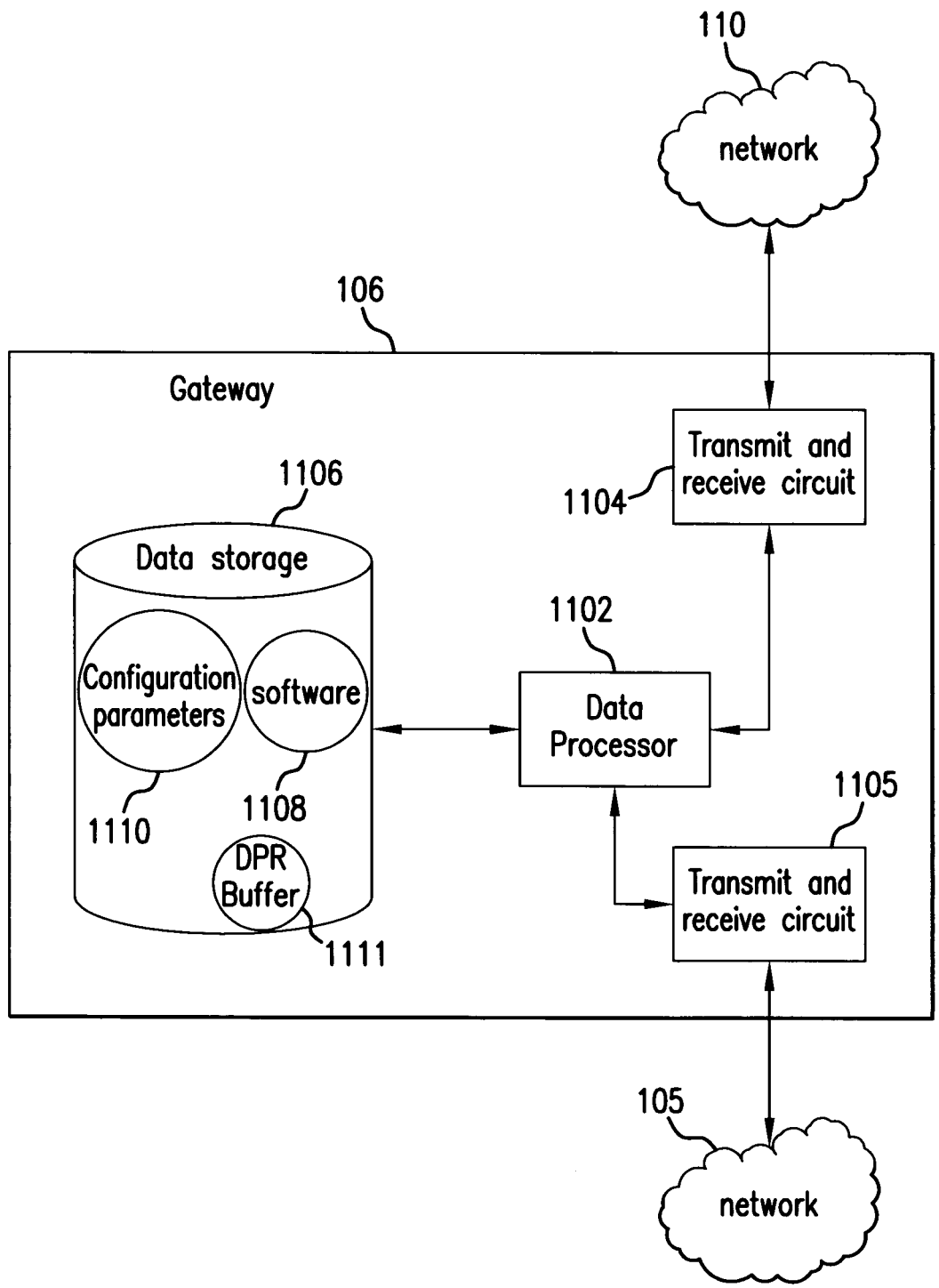
FIG. 11 is a block diagram of a gateway server

Referring now to FIG. 11, FIG. 11 is a functional block diagram of the gateway 106 according to some embodiments of the invention. As shown, the gateway 106 may comprise a data processing system 1102 (e.g., one or more microprocessors), a data storage system 1106 (e.g., one or more non-volatile storage devices) and computer software 1108 stored on the storage system 1106. Configuration parameters 1110 (e.g., bucket decrement rates) and the DPR buffer 1111 may also be stored in storage system 1106. The gateway 106 also includes transmit/receive (Tx/Rx) circuitry 1104 for transmitting data to and receiving data from the network 110 and transmit/receive (Tx/Rx) circuitry 1105 for transmitting data to and receiving data from the network 105. The software 1108 is configured such that when the processor 1102 executes the software 1108, the gateway 106 performs steps described above (e.g., steps describe above with reference to the flow charts). For example, software 1108 may include: (1) computer instructions for transmitting, from the gateway, to a network node (e.g. a base station 104) via a communication network a downstream packet comprising application data intended for a user equipment (UE) wirelessly connected to the network node; (2) computer instructions for receiving, at the gateway, via the communication network an upstream packet, wherein (a) the upstream packet comprises downstream congestion information indicating whether the downstream packet traversed a node in the communications network that detected congestion or incipient congestion and (b) the upstream packet was transmitted by the network node towards the gateway or includes a packet that was transmitted by the network node towards the gateway; and (3) computer instructions for adjusting a traffic counter associated with the UE by an amount, wherein the amount is based, at least in part, upon (i) the value of the downstream congestion information and (ii) the amount of the application data that was included in the downstream packet.

Figure 12:
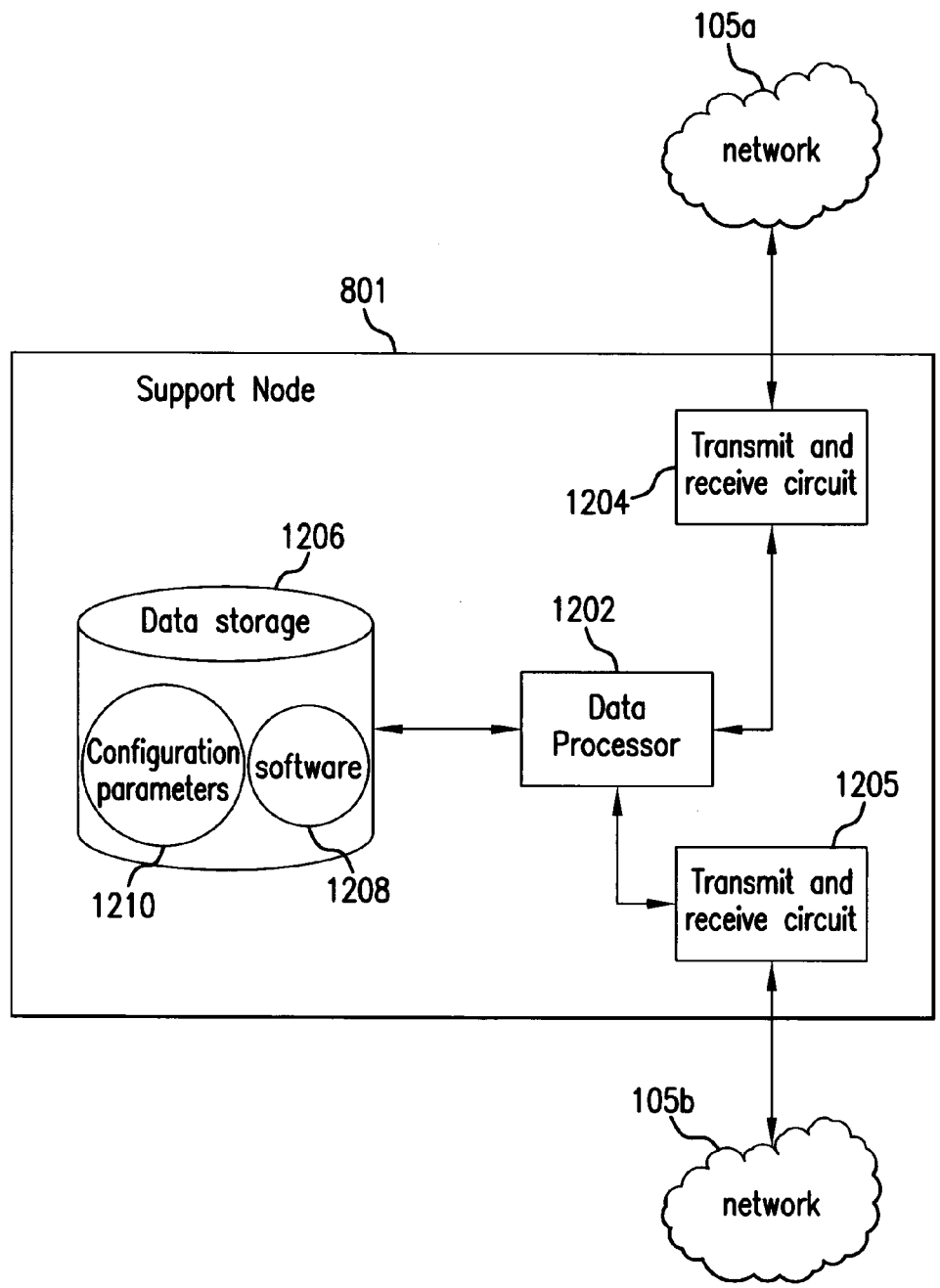
FIG. 12 is a block diagram of a support node

Referring now to FIG. 12, FIG. 12 is a functional block diagram of the support node 801 according to some embodiments of the invention. As shown, the support node 801 may comprise a data processing system 1202 (e.g., one or more microprocessors), a data storage system 1206 (e.g., one or more non-volatile storage devices) and computer software 1208 stored on the storage system 1206. Configuration parameters 1210 may also be stored in storage system 1106. The support node 801 also includes transmit/receive (Tx/Rx) circuitry 1204 for transmitting data to and receiving data from the network 105a and transmit/receive (Tx/Rx) circuitry 1205 for transmitting data to and receiving data from the network 105b. The software 1208 is configured such that when the processor 1202 executes the software 1208, the support node 801 performs steps described above with reference to the flow chart shown in FIG. 9.

Figure 13:
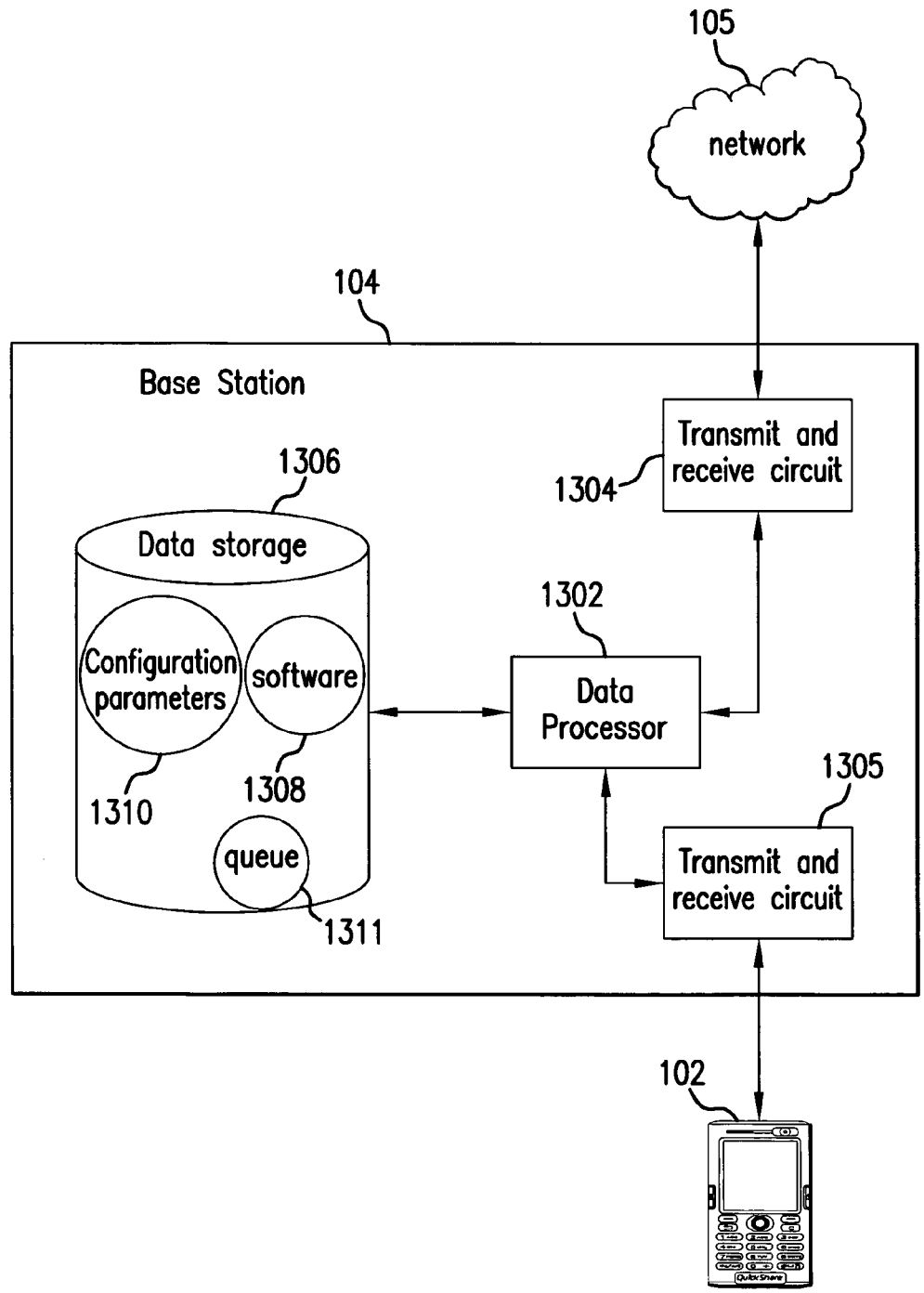
FIG. 13 is a block diagram of a base station.

Referring now to FIG. 13, FIG. 13 is a functional block diagram of the base station 104 according to some embodiments of the invention. As shown, the base station 104 may comprise a data processing system 1302 (e.g., one or more microprocessors), a data storage system 1306 (e.g., one or more non-volatile storage devices) and computer software 1308 stored on the storage system 1306. Configuration parameters 1310 (e.g. predetermined conditions under which empty upstream packets will be sent) and notification queue 1311 may also be stored in storage system 1306. The base station 104 also includes transmit/receive (Tx/Rx) circuitry 1304 for transmitting data to and receiving data from the network 105 and transmit/receive (Tx/Rx) circuitry 1305 for transmitting data to and receiving data from user equipment 102. The software 1308 is configured such that when the processor 1302 executes the software 1308, the base station 104 performs steps described above with reference to the flow charts. For example, software 1308 may include: (1) computer instructions for receiving, via a communication network, a downstream packet transmitted from a network node (e.g., gateway 106 or support node 801), the downstream packet comprising application data intended for a user equipment (UE); (2) computer instructions for receiving a data packet from a (UE) via wireless communication; and (3) computer instructions for transmitting an upstream packet towards the network node via the communication network, wherein the upstream packet comprises (a) downstream congestion information indicating whether the downstream packet traversed a node in the communication network that detected congestion or incipient congestion and (b) the data packet.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of metering data traffic, comprising:
a first network node transmitting, towards a second network node via a communication network, a downstream packet comprising application data intended for a user equipment (UE) served by the second network node;
the first network node receiving, via the communication network, an upstream packet, wherein:
(a) the upstream packet comprises downstream congestion information indicating whether the downstream packet traversed some other network node in the communications network that detected congestion or incipient congestion, and
(b) the upstream packet was transmitted by the second network node towards the first network node or includes a packet that was transmitted by the second network node towards the first network node; and
the first network node adjusting a traffic counter associated with the UE by an amount, wherein the amount is based on, at least in part, (i) the value of the downstream congestion information and (ii) the amount of the application data that was included in the downstream packet.

2. The method of claim 1, further comprising the steps of:
the first network node comparing the traffic counter with a predetermined traffic limit; and
the first network node performing a predetermined penalty action in response to a determination that the traffic counter exceeds the predetermined traffic limit.

3. The method of claim 1, further comprising the first network node receiving the downstream packet prior to transmitting the downstream packet towards the second network node, wherein
the step of transmitting the downstream packet to the second network node comprises the first network node creating a second downstream packet having a first header, a second header, and a payload portion, wherein the payload portion comprises the downstream packet, the first header includes a downstream packet identifier (DPI), and the second header includes an explicit congestion notification (ECN) field for storing congestion information,
the upstream packet further comprises (a) a payload containing application data transmitted by a UE communicating with the second network node and (b) upstream congestion information indicating whether the upstream packet traversed a node in the communication network that detected congestion or incipient congestion, and
the method further comprises: the first network node adjusting a traffic counter associated with the UE by an amount that is based, at least in part, upon (i) the value of the upstream congestion information and (ii) the amount of the application data that was included in the upstream packet.

4. The method of claim 1 wherein the upstream packet further comprises a downstream packet identifier (DPI) that identifies the downstream packet from among a plurality of downstream packets, and wherein the downstream packet identifier is stored in 1) a port field of a User Datagram Protocol (UDP) or Transmission Control Protocol (TCP) header included in the upstream packet, 2) a virtual path identifier (VPI), virtual channel identifier (VCI) or channel identifier (CID) field of an ATM header included in the upstream packet, or 3) a tunnel endpoint identifier field of a tunneling protocol header included in the upstream packet.

5. The method of claim 1, further comprising:
after transmitting the downstream packet, the first network node transmitting, towards the second network node via the communication network, a second downstream packet comprising application data intended for a second UE connected to the second network node;
after transmitting the second downstream packet, the first network node transmitting, towards the second network node via the communication network, a third downstream packet comprising application data intended for a third UE connected to the second network node;
after transmitting the third downstream packet, the first network node receiving, via the communication network, a second upstream packet, wherein (a) the second upstream packet comprises a header containing congestion information indicating that both the second downstream packet intended for the second UE and the third downstream packet intended for the third UE traversed a node in the communications network that detected congestion or incipient congestion and (b) the second upstream packet was transmitted by the second network node towards the first network node or includes a packet that was transmitted by the second network node towards the first network node, wherein the congestion information comprises a data packet identifier (DPI) identifying the third downstream packet and a data congestion value; and
in response to receiving the second upstream packet, the first network node (a) adjusting a traffic counter associated with the second UE by an amount that is based, at least in part, upon (i) the data congestion value and (ii) the amount of the application data that was included in the second downstream packet and (b) adjusting a traffic counter associated with the third UE by an amount that is based, at least in part, upon (i) the data congestion value and (ii) the amount of the application data that was included in the third downstream packet, wherein
the first downstream packet includes a first DPI included in a header of the first downstream packet,
the second downstream packet includes a second DPI included in a header of the second downstream packet,
the third downstream packet includes a third DPI included in a header of the third downstream packet, and
the DPI included in the header of the second upstream packet is equal to the third DPI.

6. The method of claim 1, wherein:
the step of transmitting the downstream packet to a second network node comprises transmitting the downstream packet to a support node; and
the step of receiving the upstream packet comprises receiving the upstream packet from the support node.

7. A gateway, comprising:
a transmit and receive circuit operable to:
    transmit towards a network node via a communication network a downstream packet comprising application data intended for a user equipment (UE) connected to the network node, and
    receive via the communication network an upstream packet that was transmitted by the network node towards the gateway or includes a packet that was transmitted by the network node towards the gateway, wherein the upstream packet comprises downstream congestion information indicating whether the downstream packet traversed a node in the communications network that detected congestion or incipient congestion; wherein the gateway further comprises:
a data processing system that is configured such that, as a result of the gateway receiving the upstream packet, the data processing system adjusts a traffic counter associated with the UE by an amount that is based on, at least in part, (i) the value of the downstream congestion information and (ii) the amount of the application data that was included in the downstream packet.

8. The gateway of claim 7, further comprising a second transmit and receive circuit, wherein
the second transmit and receive circuit is operable to receive a packet transmitted from a device,
the data processing system is configured such that, as a result of the gateway receiving the packet from the device, the data processing system generates the downstream packet, and
the generated downstream packet includes a first header, a second header, and a payload portion, wherein the payload portion comprises the packet transmitted from the device, the first header includes a downstream packet identifier (DPI), and the second header includes a field for storing congestion information.

9. The gateway claim 7, wherein
the upstream packet further comprises (a) a payload containing application data transmitted by a UE communicating with the network node and (b) upstream congestion information indicating whether the upstream packet traversed a node in the communication network that detected congestion or incipient congestion, and
the data processing system is further configured to adjust a traffic counter associated with the uploading UE by an amount that is based, at least in part, upon (i) the value of the upstream congestion information and (ii) the amount of the application data that was included in the upstream packet.

10. The gateway of claim 7, wherein the upstream packet further comprises a downstream packet identifier that identifies the downstream packet from among a plurality of downstream packets and wherein the downstream packet identifier is stored in 1) a port field of a User Datagram Protocol (UDP) or Transmission Control Protocol (TCP) header included in the upstream packet, 2) a virtual path identifier (VPI), virtual channel identifier (VCI) or channel identifier (CID) field of an ATM header included in the upstream packet, or 3) a tunnel endpoint identifier field of a tunneling protocol header included in the upstream packet.

11. The gateway of claim 7, wherein
the transmit and receive circuit is further operable to:
    transmit towards the network node via the communication network a second downstream packet after transmitting the first downstream packet, the second downstream packet comprising application data intended for a second UE connected to the network node,
    transmit towards the network node via the communication network a third downstream packet after transmitting the second downstream packet, the third downstream packet comprising application data intended for a third UE connected to the network node, and
    receive a second upstream packet after transmitting the third downstream packet, wherein the second upstream packet (a) comprises a header containing congestion information indicating that both the second downstream packet intended for the second UE and third downstream packet intended for the third UE traversed a node in the communications network that detected congestion or incipient congestion and (b) was transmitted by the network node towards the gateway or includes a packet that was transmitted by the network node towards the gateway, wherein the congestion information comprises a data packet identifier (DPI) identifying the third downstream packet and a data congestion value; and the data processing system is configured such that, in response to the gateway receiving the second upstream packet, the data processing system:

adjusts a traffic counter associated with the second UE by an amount that is based, at least in part, upon (i) the data congestion value and (ii) the amount of the application data that was included in the second downstream packet, and adjusts a traffic counter associated with the third UE by an amount that is based, at least in part, upon (i) the data congestion value and (ii) the amount of the application data that was included in the third downstream packet.

12. The method according to claim 1, wherein the traffic counter associated with the UE represents a limit on an amount of data that is allotted for download to the UE.

* * * * *

UNITED STATES PATENT AND TRADEMARK OFFICE
CERTIFICATE OF CORRECTION

PATENT NO. : 8,942,096 B2  
APPLICATION NO. : 13/375625  
DATED : January 27, 2015  
INVENTOR(S) : Arvidsson et al.

Page 1 of 1

It is certified that error appears in the above-identified patent and that said Letters Patent is hereby corrected as shown below:

In the Specification

Column 4, Line 51, delete "with he" and insert -- with the --, therefor.

Column 5, Line 57, delete "(UPD)" and insert -- (UDP) --, therefor.

Column 9, Line 1, delete "packet 400" and insert -- packet 450 --, therefor.

Column 9, Line 34, delete "DPI field 452" and insert -- DPI field 453 --, therefor.

Column 13, Line 50, delete "DCI. or" and insert -- DCI or --, therefor.

In the Claims

Column 22, Line 23, Claim 9, delete "gateway claim" and insert -- gateway of claim --, therefor.

Signed and Sealed this
Twenty-first Day of July, 2015

Michelle K. Lee
*Director of the United States Patent and Trademark Office*